(12) United States Patent
Gillett

(10) Patent No.: US 10,625,593 B2
(45) Date of Patent: Apr. 21, 2020

(54) SELF-BALANCING ROBOT SYSTEM COMPRISING ROBOTIC OMNIWHEEL

(71) Applicant: Carla R. Gillett, Sacramento, CA (US)

(72) Inventor: Carla R. Gillett, Sacramento, CA (US)

(73) Assignee: Carla R. Gillett, Sacramento, CA (US)

( * ) Notice: Subject to any disclaimer, the term of this patent is extended or adjusted under 35 U.S.C. 154(b) by 0 days.

(21) Appl. No.: 15/331,820

(22) Filed: Oct. 22, 2016

(65) Prior Publication Data

US 2017/0106738 A1 Apr. 20, 2017

Related U.S. Application Data

(63) Continuation of application No. 13/872,054, filed on Apr. 26, 2013, now Pat. No. 9,586,471.

(51) Int. Cl.
*B60K 7/00* (2006.01)
*B60K 17/30* (2006.01)
(Continued)

(52) U.S. Cl.
CPC .......... *B60K 7/0007* (2013.01); *A63C 17/014* (2013.01); *A63C 17/12* (2013.01); *B60B 19/003* (2013.01); *B60K 17/30* (2013.01); *B60K 31/0058* (2013.01); *B60L 53/80* (2019.02); *B60W 50/082* (2013.01); *B62J 99/00* (2013.01); *B62K 5/08* (2013.01); *B62K 11/007* (2016.11); *B62K 11/02* (2013.01); *B62K 17/00* (2013.01); *B62K 21/12* (2013.01); *B62K 21/26* (2013.01); *B62K 23/02* (2013.01); *B62K 25/02* (2013.01); *G05D 1/0016* (2013.01); *G05D 1/0088* (2013.01); *G05D 1/0231* (2013.01); *G05D 1/0257* (2013.01);
*G05D 1/0276* (2013.01); *G05D 1/0278* (2013.01); *A63C 2203/12* (2013.01); *B60K 2007/0038* (2013.01);
(Continued)

(58) Field of Classification Search
CPC .......... B60K 7/0007; B60K 2007/0038; B60K 2007/0092; B60K 17/30; B60K 31/0058; B62K 11/007; B62K 25/02; B62K 2204/00; B62K 11/02; B62K 5/08; B62K 17/00; B62K 21/12; B62K 21/26; B62K 23/02; B60B 19/003; G05D 1/0016; G05D 1/0088; G05D 1/0231; G05D 1/0257; G05D 1/0278; G05D 1/0276; B60L 53/80; B60W 50/082; B62J 99/00; A63C 17/014; A63C 17/12
USPC ........................................................ 180/167
See application file for complete search history.

(56) References Cited

U.S. PATENT DOCUMENTS 7,730,978 B2 * 6/2010 Dixon ...................... B25J 5/007
180/7.1
8,260,463 B2 * 9/2012 Nakamoto ................. B25J 5/00
700/259
(Continued)

*Primary Examiner* — John D Walters

(57) ABSTRACT

A self-balancing robot system providing AI humanoid robots or robot vehicles comprising a drive wheel propulsion system configured to achieve mobility and balance by means of sensing system components, accelerometers, and trajectory algorithms. The self-balancing robot system components include; a computer control system with processors and memory, a motion control system, an autonomous drive system, a wireless communication system comprising I/O system processes including WIFI, Bluetooth, and a smartphone, a network system, and a user interface control.

15 Claims, 14 Drawing Sheets

(51) Int. Cl.
*B60L 53/80* (2019.01)
*B60K 31/00* (2006.01)
*G05D 1/02* (2020.01)
*B62K 11/00* (2006.01)
*B60B 19/00* (2006.01)
*B62K 25/02* (2006.01)
*G05D 1/00* (2006.01)
*A63C 17/01* (2006.01)
*A63C 17/12* (2006.01)
*B60W 50/08* (2020.01)
*B62J 99/00* (2020.01)
*B62K 5/08* (2006.01)
*B62K 11/02* (2006.01)
*B62K 17/00* (2006.01)
*B62K 21/12* (2006.01)
*B62K 21/26* (2006.01)
*B62K 23/02* (2006.01)

(52) U.S. Cl.
CPC ... *B60K 2007/0092* (2013.01); *B60L 2200/12* (2013.01); *B60W 2420/52* (2013.01); *B60W 2710/20* (2013.01); *B60Y 2200/91* (2013.01); *B62J 2099/004* (2013.01); *B62J 2099/0013* (2013.01); *B62K 2204/00* (2013.01); *B62K 2207/00* (2013.01); *B62K 2207/02* (2013.01); *B62K 2207/04* (2013.01); *G05D 2201/0206* (2013.01)

(56) References Cited

U.S. PATENT DOCUMENTS 8,994,776 B2\* 3/2015 Sutherland ............... B25J 5/007
 348/14.05
2008/0231221 A1\* 9/2008 Ogawa ................... B25J 5/007
 318/568.12

\* cited by examiner

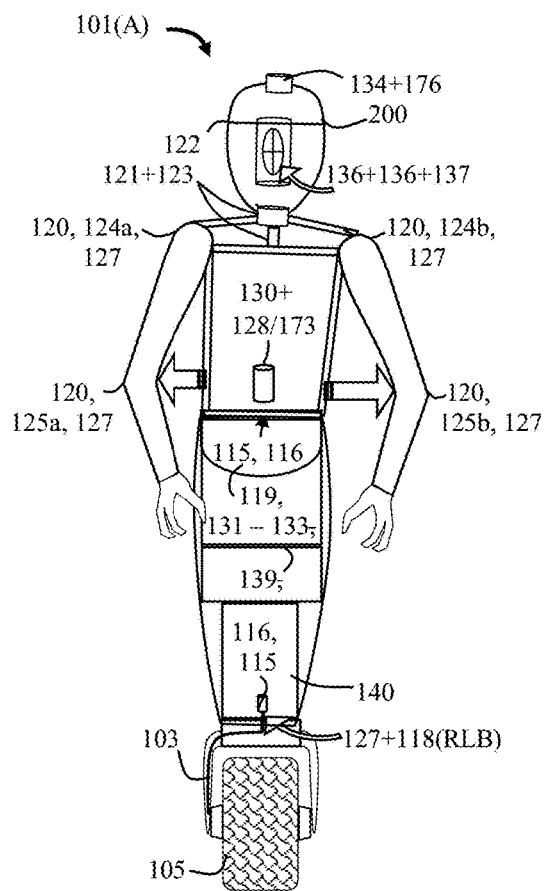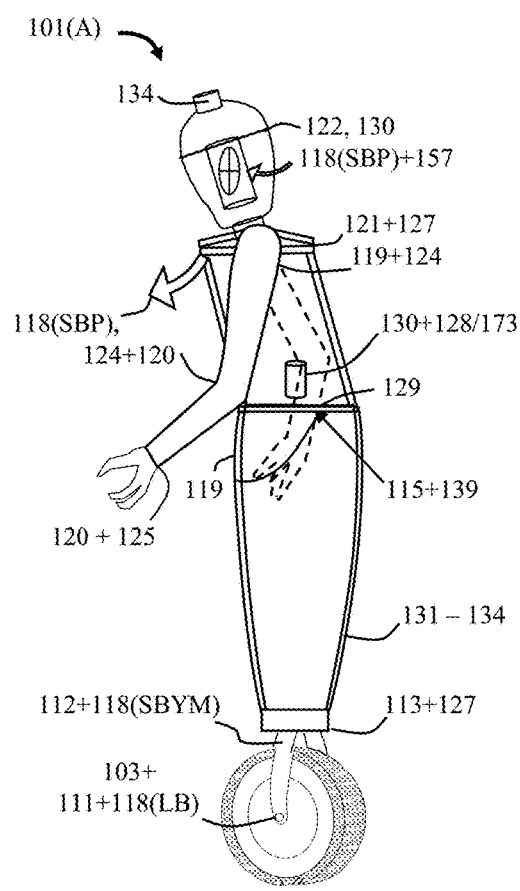
FIG. 3A
FIG. 3B

MOTION CONTROL SYSTEM 132

801. The processors 147 communicate a memory configured to store programming instructions 149, and the processor configured to execute the programming instructions for the robot 101 and the robot 102;

802. The processor 176 to read and interpret LIDAR 134 codes that encode robot 101/102 location and associated data 150 as fiducials to determine sensory system 154 information and store the data in memory 148;

803. A process to receive navigation information from a satellite modem 191 configured to receive a satellite signal and to communicate the data information 150 to the robot 101 and the robot 102 via signal inputs 156;

804. A process to receive map data information from one or more GPS satellites 194; via GPS interface 184;

805. A process to receive image data from an IMU sensor 173, optical sensor 174, and other sensory system sensor 154 configured to capture around the robot 101 and the robot 102;

806. A process to receive distance information from a distance sensor configured to sense objects positioned around the robot 101 and the robot 102;

807. A process to determine a fusion method for information measured by the image sensor and the distance sensor based on a receiving state of the satellite navigation receiver and precision of the map data to recognize the driving environment of the robot 101 and the robot 102;

808. A process to determine a reception strength of the navigation information and to determine a precision level of the GPS mapping data of the robot 101 and the robot 102;

809. A process to extract from an object and from information measured by the LIDAR sensor 134 and the altitude sensory system 135, and the information extracted from the gyro/MEMS accelerometers 128 used to recognize irregular balance when driving through environments, and recognize forced off balance from impact;

810. A process of the smart highway robot system 100 in real time, respectively to provide positioning information associated with a current location of robot 101 and of robot 102, and the positioning system 160 gathers the information via smart highway tags 161;

811. A process to engage power ON to drive through environment and a process calibrate mapping path to drive and to autonomously self-dock to charge, and subsequently shut OFF power.

FIG. 8

AUTONOMOUS CONTROL SENSOR SYSTEM 133

901. The computing device 170 comprising: one or more processors 147, gyro/MEMS accelerometers 128 and the status sensors 131 for controlling the service robot 101 and the robot vehicle 102;

902. An I/O Interface configured to communicate with server 171 the network system 151; and memory 148 for storing program instruction 148 used by the one or more processors 147,176,177 data information received from the wireless communication system 138; and WIFI/Bluetooth 197;

903. One or more processors are configured to execute instructions stored in the memory to: identify an unexpected driving environment; send information received from sensors; IMU 173, optical 174, location 175, and analog sensors 178 associated with the sensory system 154 and from the altitude sensoring system 135;

904. The IMU 173 configured to capture changes in velocity, acceleration, wheel revolution speed, yaw, and distance to objects within the surrounding environment for use by the computing device 170 to estimate position and orientation of the autonomous robot 101 and the robot vehicle 102 steering angle, for example in a dead-reckoning system, not shown;

905. The sensory system 154 captures data representative of changes in x, y, and z-axis position, velocity, acceleration, rotation angle, and rotational angular rate for the service robot 101 and the robot vehicle 102;

906. The sensors capturing data for a dead-reckoning system, data relating to wheel revolution speeds, travel distance, steering angle, and steering angular rate of change can be captured;

907. The LIDAR sensors 134 capture intensity values and reflectivity of each point on the object to be used for analyzing and classifying the object, for example, one of the self-balancing applications 157 stored within or accessible to the self-balancing robot system's autonomous drive system's 133, and computing device 170;

908. Optical sensors 158 capture images for processing by the computing device 170 used to detect traffic signals and traffic patterns, for example by capturing images of traffic lights, markings on the road, or traffic signs on common roadways and on smart highways 158, the smart highway system using proximity tags 159;

909. One or more GPS satellites 194 used to estimate the robot 101 and the robot vehicle 102 position and velocity using three-dimensional triangulation and time estimation, and point cloud of the LIDAR data captured by the location system 152, the LIDAR data information is stored in the memory 148;

910. One or more processors 714 are further configured to execute instructions stored in the memory 148 to send an autonomous command and to other robots and vehicles on the road may also be communicating with and sending data including sensor and/or image data to the network server 171.

FIG. 9

WIRELESS COMMUNICATION SYSTEM 138

1001. The robot 101 and robot vehicle 102 I/O Interface 146, locator device 152, wireless network 192, GPS satellite, Internet 195 and the operating system microprocessors 185, a bus interface 196 connect to an analog telemetry interface 176 and a digital telemetry interface 177 which connect to the network system 151;

↓

1002. The analog telemetry interface, provides a connection 193 to a plurality of analog sensors and microprocessors configured to generate variable voltage signals to indicate their status, along with a RS232 interface 183 and radio/RF interface 182;

↓

1003. The analog sensor is a thermometer which outputs temperature measurements as a voltage graduated analog signal;

↓

1004. The analog telemetry interface 176 includes an analog-to-digital (A/D) converter 179 which converts received analog signals to their digital representations that can be further processed by microprocessors 185;

↓

1005. The digital telemetry interface 177 provides a bidirectional connection to device 193 controlled by various digital input signals 180 and output signals 181 to and from Phone Network 192 and interface bus 196;

↓

1006. The radio interface 182 is further used to receive a remote computer data signal 187 from the network control system 151. The RS232 interface 183 provides a primary serial connection to RF interface 182;

↓

1007. The digital output 181 is a relay which controls some operational aspects from location devices sensors 152, and logic controller 212 output from user interface system 1200;

↓

1008. The bus interface 196 provides a bidirectional connection 189 to various computer systems, the data signals remotely 187 and locally 186 connecting to the satellite modem 191 and to GPS interface 184;

↓

1009. The satellite modem 190 bidirectional connects 197 to the wireless network 192 via the RF interface 182, respectively for sending instructions respective to trajectory data 160 - 169;

↓

1010. The wireless communication system 131 sending instructions respective to trajectory data to the bus interface 196 preferably by means of predetermined radio interface 182, and to wirelessly connect the Internet 195 the process is configured by the computer operating system 131.

FIG. 10

WIRELESS COMMUNICATION SYSTEM 138

SELF-BALANCING ROBOT SYSTEM COMPRISING ROBOTIC OMNIWHEEL

CROSS REFERENCED TO RELATED APPLICATIONS

A notice of issuance for a continuation in part in reference to patent application Ser. No. 13/872,054, filing date: Apr. 26, 2013, title: "Robotic Omniwheel", and also related application: Ser. No. 15/269,842 filing date 09-19-2016, title "Yoke Module System for Powering a Motorized Wheel", and also related application Ser. No. 12/655,569, title: "Robotic Omniwheel Vehicle" filing date: Jan. 4, 2010, and issued as U.S. Pat. No. 8,430,192 B2.

FIELD OF THE INVENTION

The present disclosure relates to an artificially intelligent self-balancing mobile robot system with user interaction especially capable of autonomous drive control provided by at least one traversing robotic omniwheel comprising an attitude sensing system.

BACKGROUND

Related art for compatibility the system design of the present invention provides a control platform, in addition to robotics, the intelligent control also involves control of the field of occupational robotics to meet the needs of autonomous multi-service robots for users, and for general applications. Autonomous controlled robots and robot vehicles are becoming more prevalent today and are used to perform tasks traditionally considered to work in a controlled environment indoors. As the programming technology increases, so too does the demand for robotic devices that can navigate around complex environments.

Robotic devices and associated controls, navigational systems, and other related systems are being developed for example, intelligent transportation focusing on electric driverless vehicles and hybrid forms of autonomous vehicles to transport passengers. Ideally what is essential for the advancement of robot technology is developing smart service robots and robot vehicles capable user interaction and capable of traveling on common streets and smart highway system, what's more too provide AI service robots that can verbally communicate with users providing companionship, and help out by doing domestic chores and running errands for users, and AI robot vehicles to deliver goods and cargo.

SUMMARY

The present invention is a self-balancing robot system comprising one or more robotic omniwheels, in various aspects the self-balancing robot system offers highly intelligent robots comprising a computer operating system, a motion control system, an autonomous drive system, a wireless communication system, an electrical control system and an attitude sensing system including attitude state sensors and algorithms to achieve self-balance control of the robotic omniwheel. The self-balancing service robots comprise an articulated head system utilized for user interaction and respectively as a collective array, the robots communicate when working and when traveling in cavalcades on smart highways.

BRIEF DESCRIPTION OF THE DRAWINGS

FIG. 3A a see through front view of the self-balancing robot 101(A) in accordance with the present disclosure.

FIG. 3B a see-through side view of the self-balancing robot 101(A) in accordance with the present disclosure.

FIG. 5B schematically illustrates various embodiments of the self-balancing robot 101(C) comprising two drive wheels configured with track wheel and belt system in accordance with the present disclosure.

FIG. 8 schematically illustrates a flowchart of the motion control system in accordance with the present disclosure.

FIG. 9 schematically illustrates a flowchart of the autonomous control system in accordance with the present disclosure.

FIG. 10 schematically illustrates a flowchart diagram of the wireless communication system in accordance with the present disclosure.

DETAILED DESCRIPTION OF THE DRAWINGS

Figure 1A:
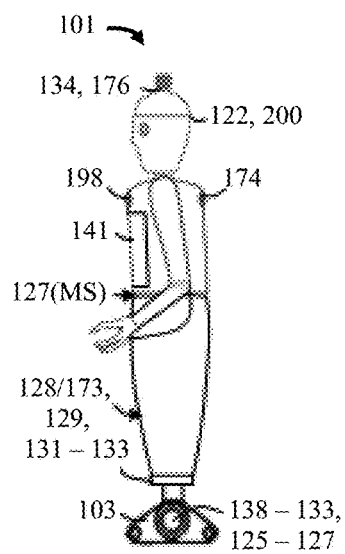
FIG. 1A schematically illustrates various embodiments of a self-balancing service robot 101(A) comprising a uni-robotic omniwheel in accordance with the present disclosure.

The present autonomous robot system offers an assortment of self-balancing robots that are designed with a collective set of commands configured for executable mobility and task handling in various driving environments. As FIG. 1 illustrates two robot types, a robot is characterized in that of a humanoid service robot 101(A) and humanoid service robot 101(B), and a robot type is characterized in that of a robot vehicle 102(A), and accordingly each robot type 101/102 can comprise a propulsion means such as; "drive wheel array" with a tire or track arrangement or "robotic omniwheels" 103 to travel on common roadways and on smart highways.

In various embodiments the robot system 100 utilizes one or more robotic omniwheels 103 to achieve self-balance control while traversing through driving environments. In one embodiment the robotic omniwheel 103 comprises an inflated tire 105 mounted about the rim of a hub wheel 104, a drive motor 109 supported by at least one axle rod 110 and at least one hub 111, the hub 111 configured to attach to a yoke module 112 comprising forked arms, and a steering motor 113 to rotate in "yaw" directions, and also the robotic omniwheel 103 comprises a fender 114 which is mounted above the yoke module 113. In one embodiment a hub wheel 104 comprising: an inflated or non-inflated tire 105 drive motor 109 (e.g. hub motor) arrangement comprising; an axle rod 110, a hub 111 and a yoke module 112 vertically mounted. In one embodiment the robotic omniwheel comprises a motorized track wheel 106 comprising a track belt 107 particularly keyed thereto in axis 108 transversely spaced in relation to the track wheels' drive motor 109, see FIG. 5A.

The robot system 100 having artificial intelligence whereby robots first and second robots 101/102 are configured with at least; a computer operating system 131, a motion control system 132, autonomous drive system 133 comprising LIDAR sensor 134, and an attitude sensing system 135 including attitude state sensors 136, and algorithm 137, a wireless communication system 138, and an electrical control system 139, and also a battery bank with battery charger 140 which are situated on the robot body 119 and wired throughout with USB 115 cable and wiring connections 116, the USB 115 cable can also provide power to electronic components as shown the configurations.

In various embodiments one or more processes for the robot system 100 to statically work during the battery charging process thus to charge a battery bank via the USB 115 communication component. One example of a communication component is a communication port, such as a Universal Serial Bus (USB) port to connect to the robot 101 and accordingly to work as a power source to furnish electrical components power and to recharge the lithium battery bank 140 and batteries situated in the legs 126, see FIG. 5B.

In one embodiment the robot 101 is comprising a robot body 119, the robot body having upper section, a torso section comprising a jointed mid-section 129, and a lower section is attached to one robotic omniwheel 103 or attached to two legs 126. The robot body 119 respectively comprising wherein: at least that of a frame 121, an articulated head 122, a neck 123, a plurality of arms 124, and also hand grippers 125 different scenarios apply.

Respectively the robot system's 100 smart service robots are depicted in one or more embodiments the humanoid service robot 101 comprises an articulated head 122 configured with a LED display system 211 and comprising a LIDAR sensor 134 situated at the top. Accordingly, robot frame 121 via coupling 127 attaches to a neck 123, to the arms 124a, 124b. In FIGS. 1A and 2B the robot base attaches to a drive wheel array including: a robotic omniwheel 103 attaches via a coupling means 127. In FIGS. 4B and 5B the frame 121 is attached to the leg 121a via coupling 127a and is attached to the leg 121b via coupling 127, and accordingly each leg is attached at the bottom too robotic omniwheel 103a via coupling 127a, and to robotic omniwheel 103b via coupling 127b.

In various embodiments a plethora of actuators 120 for joint motion control comprise: a neck 123 using actuator 120 for 45 degree movement, an arm 124 using actuator 120 for 270 degree rotation at the shoulder, and "elbow" actuators 120 for 90 degree bending, and also "wrist" actuators 120 for 270 degree fore and aft rotation, and also leg 121 and actuators 120 for 90-130 or the approximate degree rotation at the "knee", and "ankle" actuators 120 for 45 degree fore and aft rotation or the approximate.

A method for anthropomorphic motion, sensed by the plurality of control sensors, into a collective set of commands to actuate the plurality of robotic devices, wherein the collective set of commands is functionally equivalent to adaptive autonomous motion, and plausibly a plurality of control sensors can be attached to an operator to monitor the user vital signs, and also sensor coordinated robotic control device converts the user arm and leg motions to be mimicked as robot anthropomorphic motion states. The humanoid robot motion control system to include a collective set of commands with one or more computer systems configured with executable instructions for human or user anthropomorphic motion states and the humanoid robot is to recognize the user actions and body movements and to subsequently copy the user motions.

In one embodiment the robot 101 characterized in that the robot body 119 is configured having self-balancing methodology utilizing the altitude state sensor 136 and a gyro/MEMS, accelerometer 128, or an IMU sensor 173 will be part of a vehicle system and that system will periodically, either from the GPS-DGPS type system or from the PPS, which are not shown, know its exact location, that fact will be used to derive a calibration equation for each device and since other information such as temperature etc. will also be known that parameter can also be part of the equation. The equation can thus be a changing part of the robot system 100 that automatically adjusts to actual experience of the service robot 101 or the robot vehicle 102 in the field. The gyro/MEMS, accelerometer 128, or IMU sensor 173 can be situated on a part of the robot body 119, as well the middle of the robot body.

In one embodiment preferably the middle of the robot body having a motorized disjointed section 129 utilized for bending in various fore and aft shown and for lateral swiveling as shown by arrows 118 via actuators 120, e.g., the disjointed section 129 for fabrication assembly and for maintenance disassembly. The service robot 101 has a generally human-like upright posture and the ability to bend at a midpoint in a manner analogous to a person bending at the waist.

In various embodiments an AC/DC outlet for the robot system 100 to continuously power up, and to work during process using an AC port and DC battery charging system and a AC/DC charging station not shown, and for charging robot on a smart highway system one or more procedures for a mobile robot-drone system utilizing a wireless AC/DC rectenna system to continuously power whilst traveling on the smart highway if the smart highway were to comprise a wireless battery charging system and a battery exchange system this process is possible, however the process is not shown.

Figure 2A:
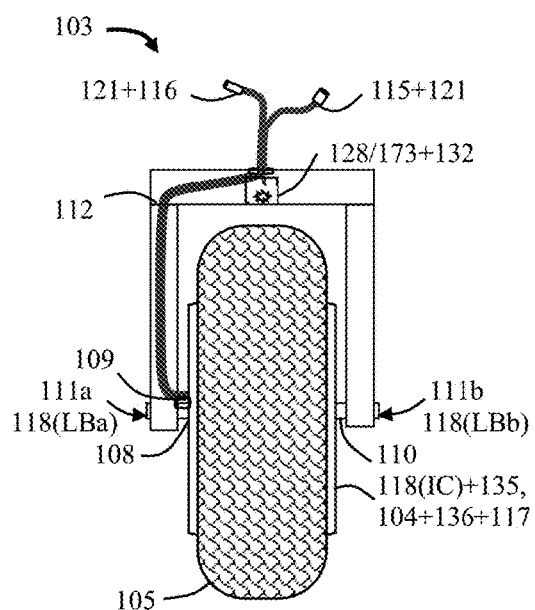
FIG. 2A a see though front view schematically illustrating various embodiments of the robotic omniwheel which is configured with an inflatable tire and an attitude sensing system 135 in accordance with the present disclosure.
Figure 2B:
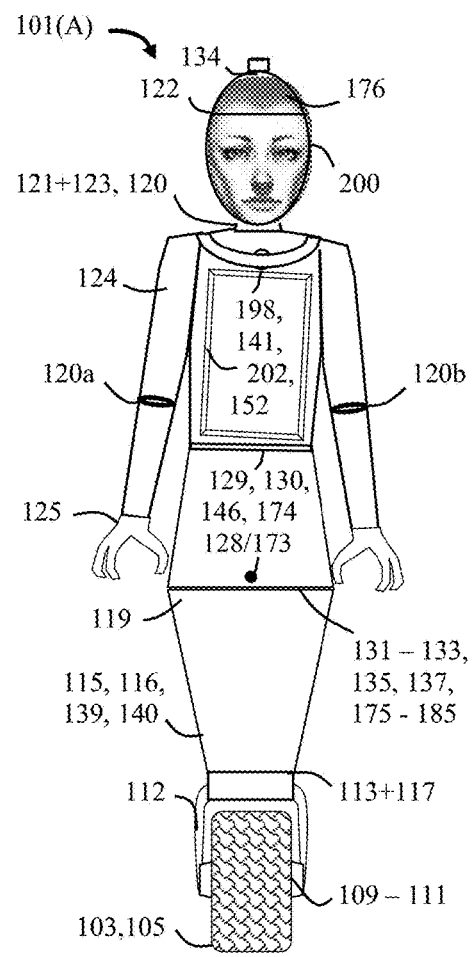
FIG. 2B schematically illustrates various embodiments of the self-balancing robot 101(A) in accordance with the present disclosure.

In one or more embodiments the robot 101 housing compartment 130 can be configured with a user PC monitor 141 shown in FIG. 2A, and in another aspect the compartment can comprise a hinged door 142 which is electrically locking preferable via wireless command. In various embodiments, the mid-section 129, the leg segment 126, or both, include one or more communication components. One example of a communication component is a communication port, such as a Universal Serial Bus (USB) port 115, to allow a person to connect a computing system to the robot system 100. Another example of a communication component is a video display screen for user interface, different scenarios apply.

In one aspect the PC monitor's 141 video display screen can permit a remote user or operator to display information, graphics, video, and to incorporate audio speakers and microphones 199 for user interaction with the head system 200 to those near the robot 100. In some embodiments, the video display screen includes a touch screen to allow input from those near the robot 101 different scenarios apply. In one embodiment the heads up display 203 generation logic data can be visually displayed on the heads LED display via the LED system 205 and also on the PC monitor 141, in various embodiments, maps, widgets such as on-screen menus, alternate camera views, and information from sensors and instruments such as from a speedometer, an odometer, and temperature sensors, as exampled for user interfacing.

In one embodiment the articulated head 122 (detailed in FIG. 12) may also comprise instrumentation, such as sensors, cameras, microphones and speakers 199 though it will be appreciated that such instrumentation is not limited to the head system 200 and can also be disposed elsewhere on the robot system 100. For instance, the articulated head 122 can include one or more LED illuminators to illuminate the environment. Illuminators can be provided to produce colored illumination such as red, green, and blue, white illumination, and infrared illumination which are shown as grayscale in drawings, this process is achievable by means of a LED display system 211, see FIG. 11.

Figure 7:
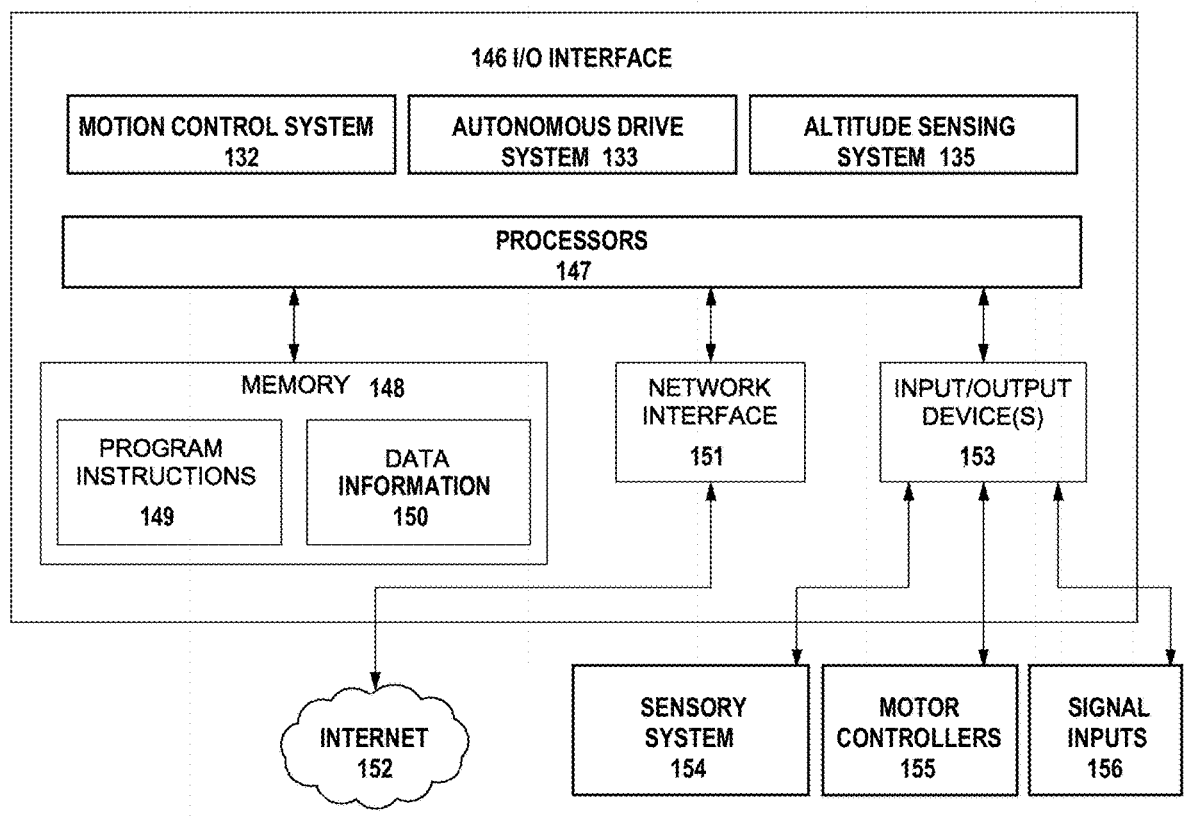
FIG. 7 schematically illustrates a block diagram of the computer operating system in accordance with the present disclosure.
Figure 11:
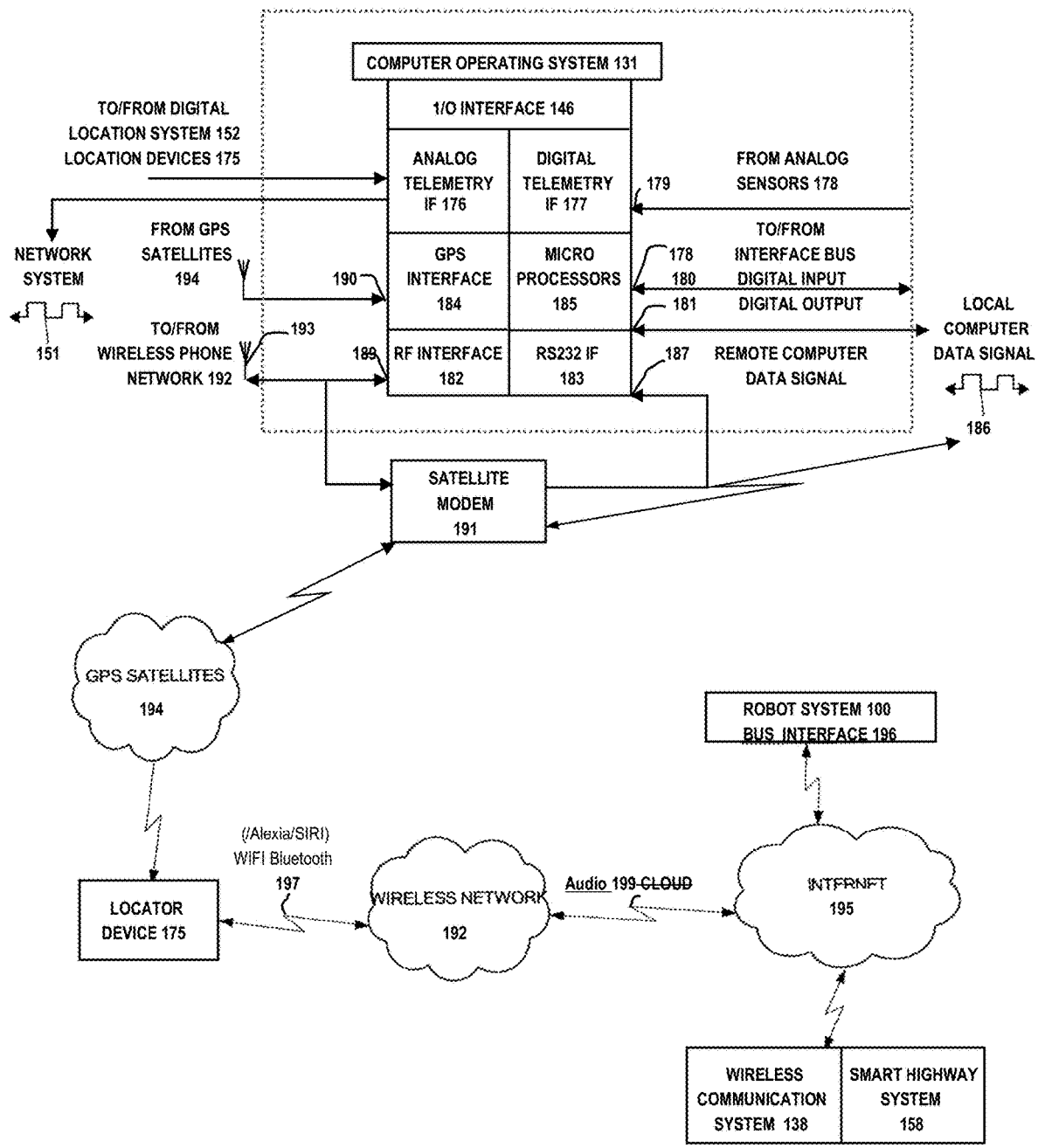
FIG. 11 schematically illustrates a block diagram of the I/O interface and network systems in accordance with the present disclosure.
Figure 11:
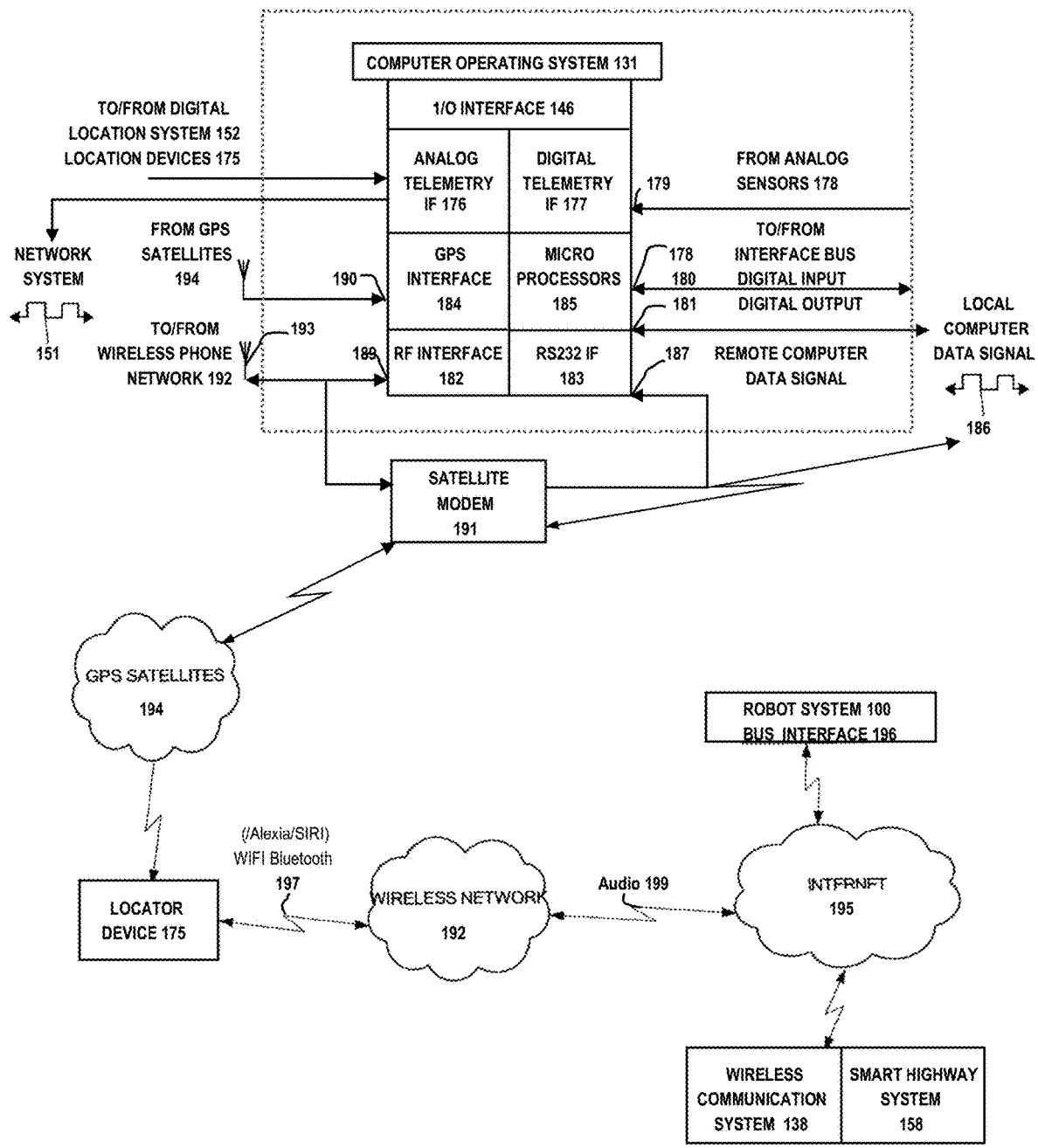

Referring now in further detail FIG. 1A is a side view of a service robot 101(A) utilizing a humanoid or respectively an android robot body 119 including at least that of; the frame 121 durable fabricated construction comprising at least one robotic omniwheel 103 having an inflated tire 105, and the hub wheel containing 135, 136, and algorithm 137, the head is 122 is comprising a LIDAR sensor 134 and a LIDAR processor 176 set on the highest point, the head 122 also comprises an articulated head system 200, see FIG. 11, and also the robot utilizing various sensors such as an optical sensor 174, video cameras 198, and other sensors, the body 119 is configured with a jointed mid-section 129 for bending, lateral pivoting and balancing functions comprising gyro/MEMS, accelerometer 128 or an IMU sensor 173 which is cost effective, and a user PC monitor 141 containing microphones and speakers 199, and the housing compartment 130 is also containing system components 131-133, 138-157, and other robot system components, see FIGS. 7-101.

Figure 1B:
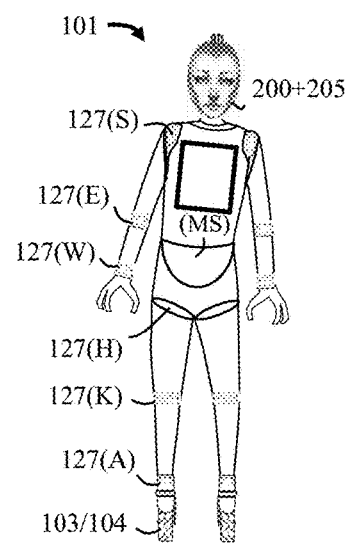
FIG. 1B schematically illustrates various embodiments of a self-balancing service robot 101(B) comprising at least one jointed leg coupled to uni-robotic omniwheel in accordance with the present disclosure.

Referring now in further detail FIG. 1B illustrates a service robot 101(B) utilizing a humanoid or respectively an android robot body 119 including at least that of; the frame 121 attaches body sections together coupling are including; the neck coupling 127(N), the upper arms having shoulder couplings 127(S) and the arms also comprising elbow couplings 127(E) and wrist couplings 127(W), and also the frame 121 attaches the upper body to the lower body via mid-section coupling 127(MS), the frame also attaches one jointed leg connecting to a rounded hip joint for bending forward, the hip coupling 127(H) is attached to the leg which comprises one knee coupling 127(K), and one ankle coupling 127(A).

Figure 1C:
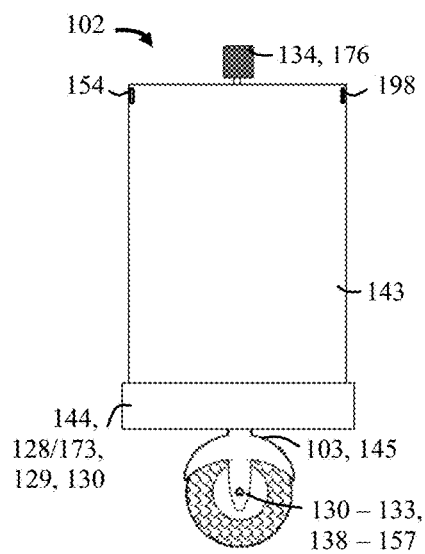
FIG. 1C schematically illustrates various embodiments of a self-balancing robot vehicle 102 comprising one or more robotic omniwheels in accordance with the present disclosure.

Referring now in further detail FIG. 1C is a side view shows a service robot vehicle 102 comprising one robotic omniwheel, the robotic omniwheel 103 comprising an attitude sensing system 135 and altitude state sensor 136 controlled by algorithm 137, the robot vehicle 102 comprising a sensory system 154 including at least one LIDAR sensor 134 managed by a LIDAR processor 176 set on the highest point of the cargo container 143, as well as the vehicle comprising video cameras 198. The robot vehicle chassis 144 is configured with a centralized axle 145 for supporting the weight of cargo, and the robot system components 131-133, 138-157 are housed in a compartment 130 situated on the chassis 144, suitably function processes and control system components are disclosed in FIGS. 7-12, various scenarios apply as discussed hereafter.

In one embodiment the robotic omniwheel comprising a drive motor 109 (preferably an electric hub motor) is enclosed in the body of a hub wheel 104, accordingly hub wheel's assembly having linear motion perpendicular to the axis 108 of rotation and parallel to the gravity line or least closing an oblique angle with the gravity line.

The robotic omniwheel 103 is configured with a yoke module 112 along with at least one hub 111 having lug nut and bolt shown by arrows 118(LB) which supports the hub wheel 104 securely. In one embodiment the yoke module is attached to the hub wheel 104 assembly respectively the connection spaced from the axis 108 of rotation of the hub wheel 104.

In one aspect the self-balancing function of the robotic omniwheel 103 is configured with a motor controller 117 and an attitude state sensor 136, respectively the motor controller 117 and the attitude state sensor 136 and the attitude sensing system 135 are contained within the "inner circumference" of the hub wheel as shown by arrow 118 (IC), and furthermore the motor controller 117 is configured to automatically adjust the attitude sensing system 135 and direction of the electric drive motor 109 to reduce a difference between a pitch measured by the attitude sensing system 135 and a zero pitch set point, wherein the attitude sensing system 135 also comprising algorithm 137 to provide a selectable variable braking input to the motor controller 117 (brake not shown), and in one aspect a parked mode (not shown) in which the robot body 119 is rotated about the axis 108 of the robotic omniwheel such that self-balancing resists lateral toppling of the service robot 101 and the robot vehicle 102. The attitude sensing system 135 is also situated in the frame 121 of the robot and is inner-connected to other attitude state sensors 136 via USB power cable 115 connections, see FIGS. 2A, 3A, and 3B, 4A and 5A.

In further detail FIG. 2A is a front see through view of the robotic omniwheel discloses the hub wheel 104 encompassed with an inflated tire 105 is configured with a drive motor 109 enclosed in the body of hub wheel 104 having vertical rotation perpendicular to axis 108, the motorized hub wheel 104 is rotably mounted on at least one axle rod 110 and that of hub 111a, 111b are configured to attach thereon a forked yoke module 112, the yoke module 112 configured for supporting the motorized hub wheel 104 on axis 108, the motorized hub wheel's drive motor 109 by means of the prewired yoke module 112 allowing the electric control system to shunt electrical power directly to the drive motor 109 via USB 115 power cable method.

In one aspect the yoke hollow conduit is containing a gyro/MEMS, accelerometer 128 or IMU sensor 173 is to detect when the yoke is not balanced during this process the motion control system 133 detects the off balance and accordingly adjustments to remain self-balanced is achieved by the attitude sensing system 135 essentially, the robotic omniwheel 103 is configured with a motor controller 117 and the attitude sensing system 135 and the state sensor 136, respectively the attitude state sensor 136 and the attitude sensing system 135 are contained within the "inner circumference" of the hub wheel as shown by arrow 118(IC), and furthermore the motor controller 117 is configured to automatically adjust the attitude sensing system 135 and direction of the electric drive motor 109 to reduce a difference between a pitch measured by the attitude sensing system 135 and a zero pitch set point.

In one embodiment the upper yoke section is 112 is coupled by mechanically attaching onto the robot's frame 121, during this process the upper end the USB 115 power cable and the electrical wire connections 116 will successively connect to the robot system 100 electric control system 139 and control components 131-133.

Referring now in further detail FIG. 2B showing front view of said service robot 101(A) characterized in that of a uni-wheeled service robot comprising a humanoid robot platform comprising wherein: at least that of a frame 121 supporting the robot's neck 123 and the robots articulated head 122 which comprises a detachable crown section for accessing the LIDAR sensor 134, and the LIDAR processor 176. The head lower section wherein is comprising the articulated head system 200. The robot body 119 configured with video cameras 198 a PC monitor 141, with a heads up display 202 via the articulated head system 200 and the Internet 194.

In one embodiment the robots articulated head 122 is supported by the neck 123 which is comprising actuator 120, and the arms 124a and 124b comprising shoulder and elbow actuators 120, and hands 125a and 125b comprising wrist actuators 120.

In one embodiment the a self-balance process 157 is configured to utilize a gyro/MEMS, accelerometer 128 or IMU sensor 173 is situated in the middle of the robot body 119, and the middle of the robot body preferably having a motorized disjointed section 129 utilized for bending in various fore and aft shown and for lateral swiveling via actuators 120, (e.g., the disjointed section 129 is utilized for bending in various fore and aft directions and for lateral swiveling action) for balance control, see FIG. 3A and FIG. 3B.

In various embodiments and also the housing compartment 130 is comprising robot system components such as the motor controller 117, and systems 131-133, and interface processes 175-185 respectively, the system processes are detailed further in FIGS. 7-10.

In one embodiment the base the robot body 119 is configured with a single robotic omniwheel 103 having an inflated tire and as shown the yoke module's 112 steering motor 113 control by means of the motor controller 117. Respectively the robotic omniwheel 103 is attached to the base of the robot body by the coupling 127 e.g., the process is achieved mechanically. The robotic omniwheel is controlled by the attitude sensing system 135 including the attitude state sensor 136, and algorithm 137 the attitude state sensor 136 is placed in the robotic omniwheel motorized wheel and/or the robot body respectively, the motion control system 132 receives a signal from the altitude state sensors 136 and then issues control instructions via motion control system procedures to balance the robot (e.g., procedure process is detailed more in the following paragraphs).

Figure 13:
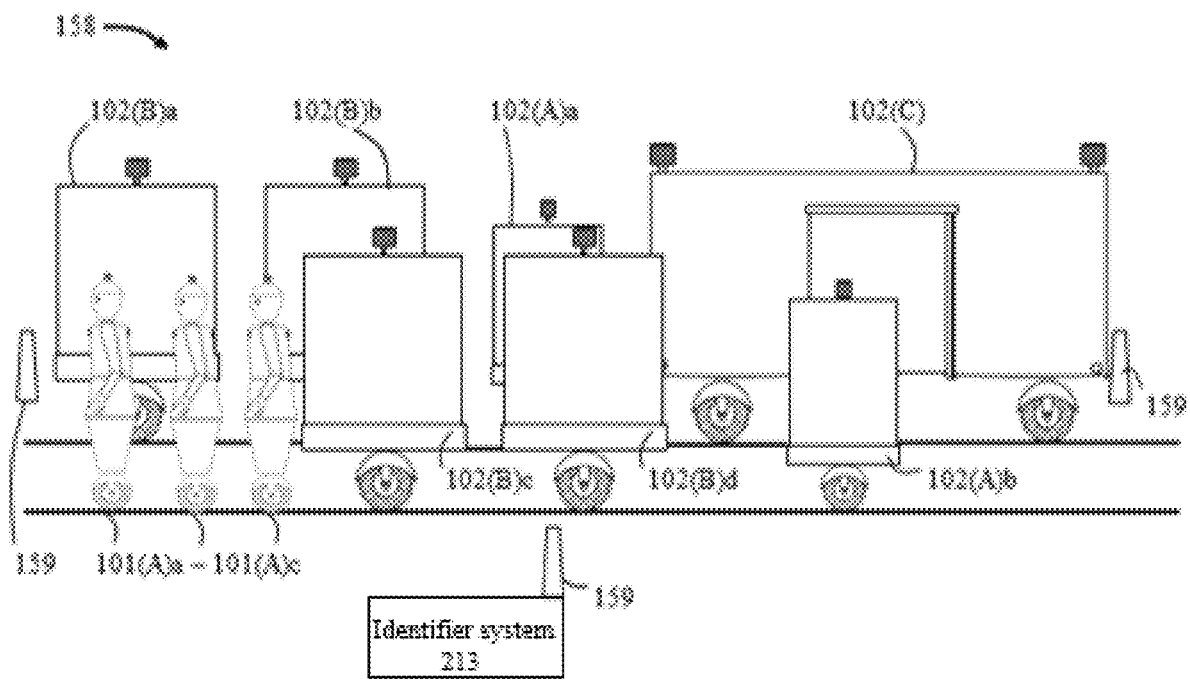
FIG. 13 schematically illustrates various embodiments of a plurality of peer robots traveling in cavalcades on a smart highway, and also disclosing a robot cargo vehicle 102(C) in accordance with the present disclosure.

In one aspect the attitude state sensor 136 is placed inside the robot body 119 in this process of the service robot 101(A) allows the service robot to uniquely travel when indoors and perceiving the service robot 101(A) can travel at high speeds on roadways such as a smart highway, these actions are perception-ally shown in FIG. 13.

Referring now in further detail FIG. 3A and FIG. 3B the see through drawings of robot 101 embodiments, as shown in FIG. 3A the service robot 101(A) having a self-balancing body 119 comprising at least that of; an articulated head 122 comprising a head system 200 and the LIDAR sensor 134, a neck 123 an autonomous drive system 133, an attitude sensing system 135 including sensor 136, and algorithm 137, arms 124 with hands 125 or grippers, the arms are configured with actuators 120, and mid-section is configured with a balance process method utilizing a gyro/MEMS, accelerometer 128 or a IMU sensor 173, a computer operating system 131, a motion control system 132, a wireless communication system 138, and also the electrical control system 139 with wiring connections 116, and also a battery bank with battery charger 140 which are situated on the lower part of the robot body and the base of the robot is comprising the yoke attached to the lower base shown by arrow 118(RLB) along with one robotic omniwheel 103 attached thereon which is comprising a tire 105. Accordingly, the robot body can comprise LED lights including signal lamps, indicator lamps, and brake lamps not shown, different access scenarios apply, and accordingly the robot fabrication process is completed by the manufacturer.

As shown in 3B the front see through side view of robot 101(A) comprising at least that of; an articulated head 122 comprising the LIDAR 134, the attitude sensing system 135 including attitude state sensor 136, and algorithm 137, arms 124 with hands 125 plus coupling 127, the robot body 119 configured with actuators 120 and bending mid-section 129 respectively configured with a balance process method utilizing a gyro/MEMS, accelerometer 128 or IMU sensor 173 and the arms configured to assist the attitude sensing system 135 as shown by arrow 144(AS), the robot configured with algorithm 137 set point other than zero as directed by the computer operating system 131 and the motion control system 132. The electrical control system 139 and battery bank with battery charger 140 are situated on the lower part of the robot body and the base of the robot. The robotic omniwheel's yoke module 112 shown by arrow as 118 (SBYM) the robotic omniwheel is supported by the hub 111 with lug nut and bolts.

Figure 4A:
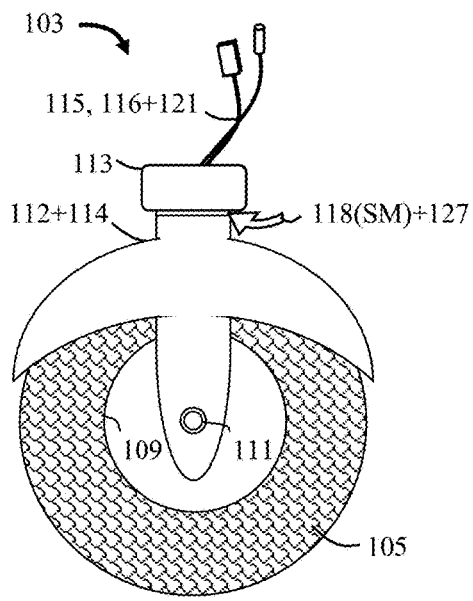
FIG. 4A schematically illustrates various embodiments of the robotic omniwheel 103 in accordance with the present disclosure.
Figure 4B:
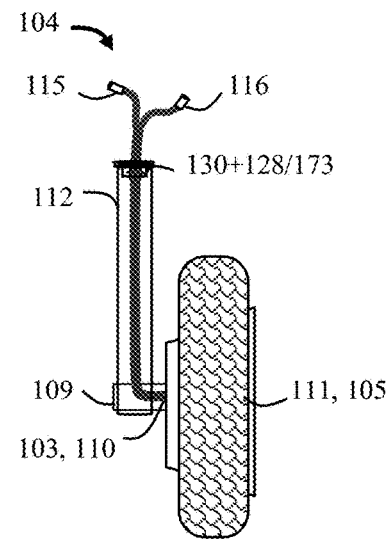
FIG. 4C schematically illustrates various embodiments of a self-balancing service robot 101(B) comprising one jointed leg coupled to uni-robotic omniwheel in accordance with the present disclosure.
FIG. 4D schematically illustrates various embodiments of the self-balancing robot 101(BB) comprising two jointed legs coupled to a drive wheel array in accordance with the present disclosure.

In further detail FIG. 4A shows a side view of the robotic omniwheel 103 comprising a tire 105 and a fender 114 and the robotic omniwheel is the couple the yoke motor onto the base of the robot body frame 121 as shown by arrow 118(SM) and the steering motor is comprising the USB 115 cable and wiring connections 116 subsequently are connected to all robot system components via an assembly means. As shown in FIG. 4B a hub wheel assembly 104 comprising; a wheel 105, a DC drive motor 109, an axle rod 110, a hub 111 and a yoke module 112 as vertical for coupling to the base of a leg or an arm also wiring 115,116, in this process the robot 101 can travel by gliding and skating or biped walking when drive motor is powered on or off, thus allowing the transposing service robots 101 are capable of traveling indoors and outdoors In one embodiment the yoke steering is configured to contain USB 115 power cable and wired connections wherein the USB 115 power cable connects to the yoke motor 113. The yoke module is configured to steer the motorized hub wheel 104 by means of said steering motor 113. In one aspect the yoke's upper section is coupled onto the lower section of the yoke steering motor 113, and in another aspect the steering motor's upper section is mechanically attached onto the base of robot's lower body via a coupling 127 mechanical means.

Figure 4C:
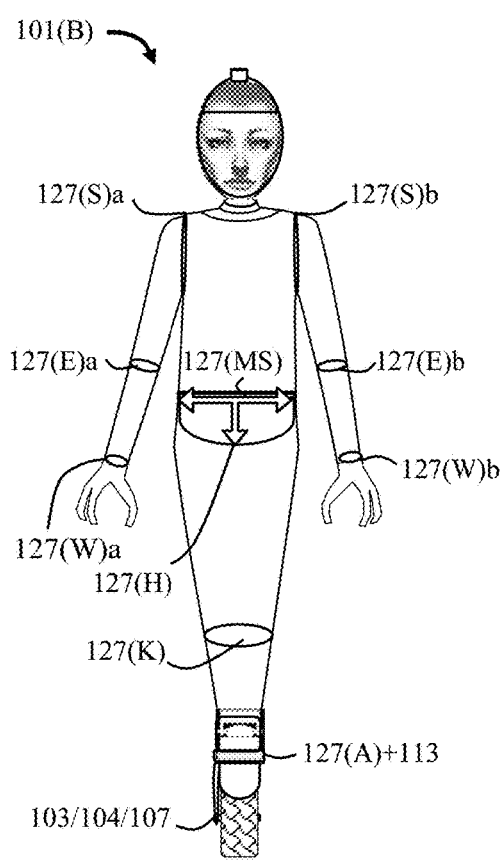

Referring now in further detail FIG. 4C a front view showing a robot also characterized in that of a service robot 101(B). In various aspects the motion control system and the wireless control system and the user utilizing wireless control system devices control the service robot 101(BB) and the robotic omniwheel operations. Respectively the service robot 101(B) utilizing a robot body 119 including at least that of; the frame 121 attaches body sections together coupling are including; the neck coupling 127(N), the upper arms having shoulder couplings 127(S) and the arms also comprising elbow couplings 127(E) and wrist couplings 127(W), and also the frame 121 attaches the upper body to the lower body via mid-section coupling 127(MS), the frame also attaches one jointed leg connecting to a rounded hip joint for bending forward and lateral pivoting motion, the hip coupling 127(H) is attached to the leg which comprises one knee coupling 127(K), and one ankle coupling 127(A). The leg embodiment comprises a power system for charging a battery pack which is illustrated and described FIG. 5B.

In one embodiment of service robot 101(B) a cantilevered yoke with a curved shaped arm is to support the robotic omniwheel, the robotic omniwheel is affixed to the hub assembly.

In one embodiment of service robot 101(B) the robotic omniwheel is configured with a cantilevered yoke motor 113 to steering the robot.

In one embodiment of service robot 101(B) the robotic omniwheel can be configured to tilt and rock by means of the one ankle (e.g., the ankle is jointed to pitch forward and backward or lateral).

In one embodiment of service robot 101(B) the robotic omniwheel is controlled by means of the self-balancing robot system comprising the self-balancing process 157 managed by at least that of: the computer operating system 131, the motion control system 132 and the autonomous drive system 133 comprising a LIDAR sensor 134 with complex processes detailed in the following processes, and the attitude sensing system 135 including the attitude state sensor 136, and algorithm 137 processes, and also wireless communication system 138 and processes, electrical process by means of the electrical control system 139, and by and wireless control system devices control by the user.

Figure 4D:
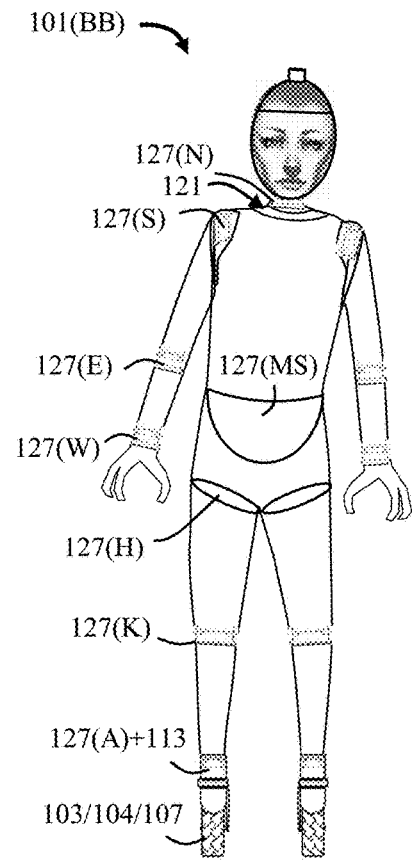

Referring now in further detail FIG. 4D a front view showing a robot also characterized in that of a service robot 101(BB) comprising drive wheel arrays. In various aspects the motion control system and the wireless control system and the user utilizing wireless control system devices control the service robot 101(BB) and the robotic omniwheel operations. Respectively the service robot 101(BB) is also utilizing a robot body 119 including at least that of; the frame 121 attaches body sections together coupling are including; the neck coupling 127(N), the upper arms having shoulder couplings(S) and the arms also comprising elbow couplings 127(E) and wrist couplings 127(W), and also the frame 121 attaches the upper body to the lower body via mid-section coupling 127(MS), the frame also attaches the upper legs to the hip couplings 127(H) for lateral pivoting motion, and the legs also comprising knee couplings 127(K), and ankle couplings 127(A) accordingly attach to yoke module, and respectively all aforementioned couplings 127 are connected via a mechanical means. The service robot 101(BB) leg components comprise a power system for charging a battery pack which is illustrated and described FIG. 5B.

In one aspect the humanoid robot platform of service robot 101(BB) is capable of traverse biped walking and capable of traverse achieving skating like motions whereby the robot body 119 configured with a self-balance process 157 utilizing a gyro/MEMS, accelerometer 128 or IMU sensor 173 is situated in the middle of the robot body 119. The self-balancing robot system comprises a self-balancing process 157 managed by at least that of: the computer operating system 131, the motion control system 132 and the autonomous drive system 133 comprising a LIDAR sensor 134 with complex processes detailed in the following processes, and the attitude sensing system 135 including the attitude state sensor 136, and algorithm 137 processes, and also wireless communication system 138 and processes, electrical process by means of the electrical control system 139, a battery bank with battery charger 140 which is further detailed see FIGS. 7-10.

In one embodiment the robot body 119 is configured to situate the computer operating system 131, the motion control system 132 and the autonomous drive system 133 in each upper leg section, thereby the light weight components set in the upper leg section addresses top heavy issues, and accordingly the electrical control system 139 and battery bank with battery charger 140 can be situated in the mid-section of the robot body 119 thereby the weight of the battery is thusly supported by the bionic like legs for additional strength.

In one aspect the motorized disjointed section 129 is utilized for bending in various fore and aft directions, for lateral balancing, for leaning sideways, and for swiveling circulation via electronic actuators 120 which are mechanically assembled the degree of bending, leaning and swiveling motion, the degree of the motorized joint motion is calculated by the motion control system 132 e.g., different calculations apply.

In one embodiment the robot body 119 is configured with jointed upper leg 126 sections working as hips connecting to the mid-section 129 accordingly the top leg portion comprising actuators 120(H) to rotate fore and aft to lift leg upward and the downward for achieving biped walking motion and also the knee section joint actuator 120(K) comprise actuators 120 to engage biped motion, and as well the bottom leg 126 working as an ankle joint using 120(A) connecting the robotic omniwheel 103a and 103b, in this process the robot 101 can travel by gliding and skating or biped walking when drive motor is powered on or off, thus allowing the transposing service robots 101 are capable of traveling indoors and outdoors, these actions are not shown.

Figure 5A:
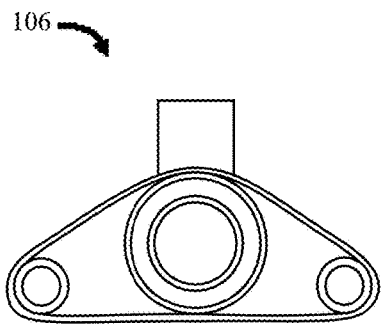
FIG. 5A and FIG. 5B schematically illustrates various embodiments of the drive wheel array configured with track wheel 106 and belt system 107 in accordance with the present disclosure.
Figure 5B:
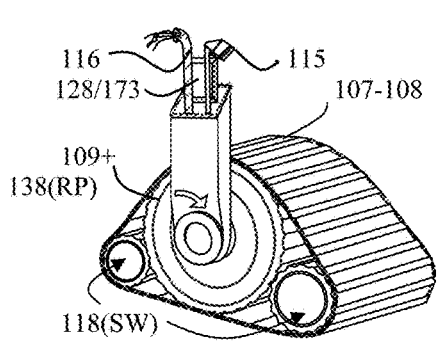

Referring now in further detail FIG. 5A illustrates a side view of a track wheel 106 assembly comprising one arm or "yoke module" 112 comprising a wiring connection means to be powered by a battery, and accordingly the track wheel 106 is arranged to provide steering and braking to balance a robot; and FIG. 5B shows a cut through view of the robotic omni-directional track wheel 106 supported by a yoke module 112 respectively the USB power cable 115 and the wire connection 116 are situated inside the hollow housing of the yoke module 112. The yoke module is also housing the MEMS, accelerometer 138 or IMU sensor 173 for balance control. The motorized track wheel 106 comprising a track belt 107 particularly, there is shown the forward drive motor 109 having sprocket wheels as shown by arrows 118(SW) and keyed thereto in axis transversely spaced in relation to a center axle rod 110 and that of a hub 111, the hub 111 configured to attach thereon to the yoke module 112. In more detail the track belt 107 section is formed of metal with an outer peripheral edge formed of a high friction and resilient material with sprocket teeth formed on the outer periphery of the sprocket wheels driving connection, the sprocket wheels having perforations along each edge of a track belt 107 as shown by arrows with circular metal plates supporting and strengthening the opposing side walls of the track belt 107.

Figure 5C:
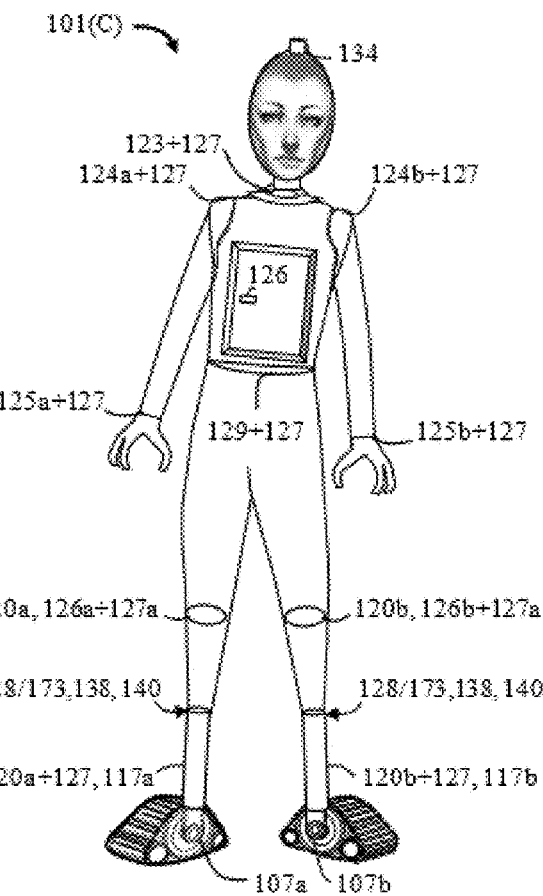

Referring now in further detail FIG. 5C shows a first service robot 101(C) also having a humanoid robot platform however the robot configured with the following configurations: the LIDAR 134, and contrivances including and neck 123, arms 124a and 124b comprising actuators 120a and 120b, and hands 125a and 25b comprising actuators 120a and 120b, and leg 126a including coupling 127a, and also leg 126b including coupling 127b, accordingly the coupling 127a is configured to attach a left robotic omni-directional track wheel 106a on the bottom leg section, and also accordingly the coupling 127b is configured to attach a right robotic omnidirectional track wheel 106b on the bottom leg section. The robot 101(C) is comprising two legs; leg 126a and leg 126b capable of a bi-ped motion and configured for traverse biped walking, rolling and skating motions. The one or more jointed legs for providing a balancing means and a steering means, and the one or more legs coupled to a robotic omniwheel; a hub wheel; a track wheel, the wheels providing a propulsion means for forward and reverse momentum and a braking means.

In one embodiment the service robot 101(C) wherein the housing has to be installed on an obstacle is detected around the robot in order the wireless sensor node (not shown) for an inductive charging to the lithium battery or battery bank 140 (different scenarios apply) located in each of service robot 101(C) legs 126, and the wireless sensor node is mounted in the battery bank 140 respectively via means of a magnetic masking layer (not shown) in the electrical control system 139 comprises a microelectromechanical system (MEMs) device 128 or IMU sensor 173 for the conversion of ambient mechanical vibration into electrical energy through the use of a variable capacitor is located inside the track wheel to recharge batteries, the process is as follows a wireless microprocessor 185 controls the provision of power to an A/D converter power to store the ambient vibrational electrical energy in the batteries 140.

Figure 6A:
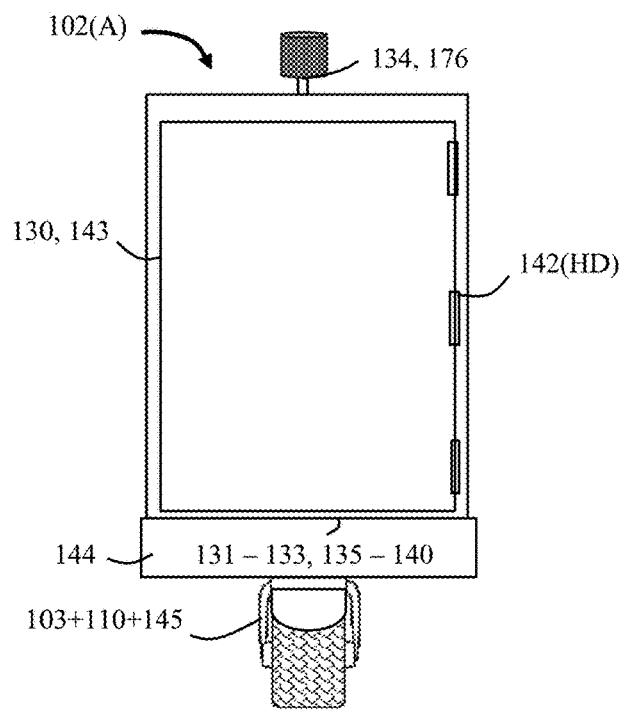
FIG. 6A schematically illustrates various embodiments of the self-balancing robot vehicle 102(A) in accordance with the present disclosure.

Referring now in more detail FIG. 6A showing a front view of the service robot vehicle 102(A) of FIG. 1A, the robot vehicle platform is uniquely configured with a vehicle body 119 having a chassis 144 configured to utilize one "uni-robotic omniwheel, respectively the robot 102(A) robot body 119 is configured to be sleek and aerodynamic whereby the chassis 144 and the uni-robotic omniwheel having linear motion perpendicular to the axis 108 of rotation and parallel to the gravity line. The robot body 119 is comprising other body cavities which can be accessed by secondary doors with locking method, not shown.

Respectively robots 102 utilize a modular body for service vehicle applications and robot vehicles 102(A), 102(B), and 102(C) see FIG. 13. Accordingly having sections this fabrication process is achieved by the manufacturer. As well, various robot system components are situated accordingly during the fabrication process, and as well the container being configured with other door types and also the container can comprise LED lights including signal lamps, indicator lamps, and brake lamps not shown, different lighting accessories and scenarios apply.

In one aspect the size of the container is configured to carry goods within, the goods can be loaded by humans or by autonomous pallets, and fork lifts, the methodology is not shown.

In various embodiments detailed in the robot vehicle 102(A) wherein embodiments utilize one or more robotic omniwheels 103 having a fender 114 and an inflated tire 105, and accordingly the vehicle body 119 is to connect to the chassis 144 via a coupling 127.

In one embodiment the robot vehicle 102(A) respectively is comprising a cargo container 143 configured for housing cargo objects, can utilize a roll top door 144 which is electrically locking and the robot vehicle 102 also utilizing a chassis 144 and a centralized axle 145 supporting the robotic omniwheel 103, different door scenarios apply.

In one embodiment the robot body 119 having a chassis 144 configured to support the weight of the payload (not shown) contained within a cargo container 143 accordingly, the cargo container 143 is situated above the primary housing compartment 130, and respectively the housing compartment 130 contains where; the computer operating system 131, the motion control system 132, the wireless communication system 138, the autonomous drive system 133, the attitude sensing system 135, and the electrical control system 139 including wiring connections 116 and USB 115 power cable, and also the battery bank with battery charger 140. In one embodiment the cargo container 143 is configured with a hinged door 142 with digital locking mechanism, not shown. The service robot vehicle 102(A) functions and processes are detailed further in FIGS. 7-10.

Figure 6B:
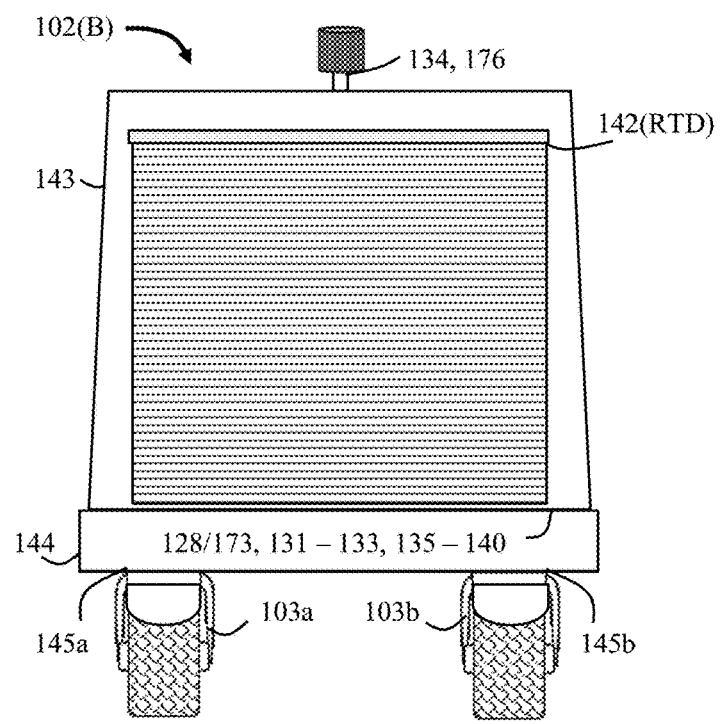
FIG. 6B schematically illustrates various embodiments of the self-balancing robot vehicle 102(B) in accordance with the present disclosure.

Referring now in further detail FIG. 6B showing front or a rear view of a service robot vehicle 102(B) is also characterized in that of a robot vehicle platform configured with a vehicle body 119 configured with one or two drive wheel array types 103, 104, 106 having a fender 114. and the drive wheels comprising the self-balancing 157 control system processes disclosed herein to keep the service robot vehicle vertical. In one embodiment the robot vehicle 102(B) is configured to operate as a self-balancing via process 157, the chassis 144 comprises a dual axle having rotation perpendicular to axis, whereby the axle 110 is configured to attach the robotic omniwheel 103 at the most centralized point for maximum balance control.

Furthermore service robot vehicle 102(B) is comprising methods to furnish power to various actuators, gyro/MEMS, accelerometer 120 or IMU sensor 173 and to other motorized contrivances, and the robotic omniwheel 103 drive motor is configured for handling high velocity speed levels to travel on common roadways and on smart highways, respectively control processes are detailed further in FIGS. 7-10.

Furthermore service robot vehicle 102(B) is comprising methods autonomous control sensors such as LIDAR 134 can be set on the roof top as shown, and a plethora of sensors e.g., listed from a sensory system 154, and accordingly, a variety of sensors are situated throughout the chassis and body to detect obstacles and to perceive physical features of the environment.

In one embodiment service robot vehicle 102(B) is fabricated by the manufacturer to comprise a chassis 144 and a cargo container 143. The chassis 144 comprises wherein dual axles a left axle 145a and a right axle 145b. Respectively robotic omniwheel 103a is coupled to left axle 145a via coupling 127a, and robotic omniwheel 103b is coupled to right axle 145b via coupling 127b.

In one aspect the size of the container is configured to be a similar to that of a common pallet, the cargo pallet is to be loaded by larger sized autonomous fork lifts.

In one embodiment aspects service robot vehicle 102(B) is comprising a power control system including a plurality of high-voltage rechargeable lithium-ion-based batteries.

In various embodiments the service robot vehicle 102(B) comprising wireless communication, cameras, LIDAR sensors and location sensors, and a computer control system and subsystems and process functions to manage one or more autonomous cargo loading operations as disclosed herein.

In various aspects the service robot vehicle 102(B) is to be loaded at a consignment location, not shown, and the service robot vehicle 102(B) is configured with a method to read and interpret visual codes that encode the at the location and other associated data as fiducials to determine loading process.

In various aspects the service robot vehicle 102(B) is configured to coordinate material handling equipment via the wireless communication system 138 which is used to interact with and control a number of robotic pallets to transport the cargo up ramps to access the inside container.

In various aspects the service robot vehicle 102(B) is configured to coordinate material handling equipment via the wireless communication system 138 which is used to interact with the material handling crew.

In various aspects the service robot vehicle 102(B) is configured to coordinate material handling equipment via the wireless communication system 138 which is used to interact with autonomous drones (not shown) which can be configured to wirelessly collaborate as peers respectively assisting one another in the loading and unloading process of service robot vehicle 102(B).

In various aspects the service robot vehicle 102(B) is configured with a method to read and interpret visual codes via a scanning system, not shown.

In various aspects the service robot vehicle 102(B) is configured with one or more methods of enabling one cargo load to be delivered in a single delivery mission, or a plurality of cargo loads to be delivered in more the one mission; a method of enabling the plurality of cargo loads being loaded at a starting location, the method comprising acts of: to travel from a starting location to a first delivery location; to second delivery location, and to the at the final location to recharge, to refuel, and maintenance and the loading process repeats.

Primarily, the service robots (A), (B), and (C) and service robot vehicles 102(A), 102(B) and also the robot vehicle 102(C) shown in FIG. 13 comprise autonomous drive methods configured for traveling on a smart highway 158, the autonomous driving process is detailed further in the following paragraphs.

Figure 12:
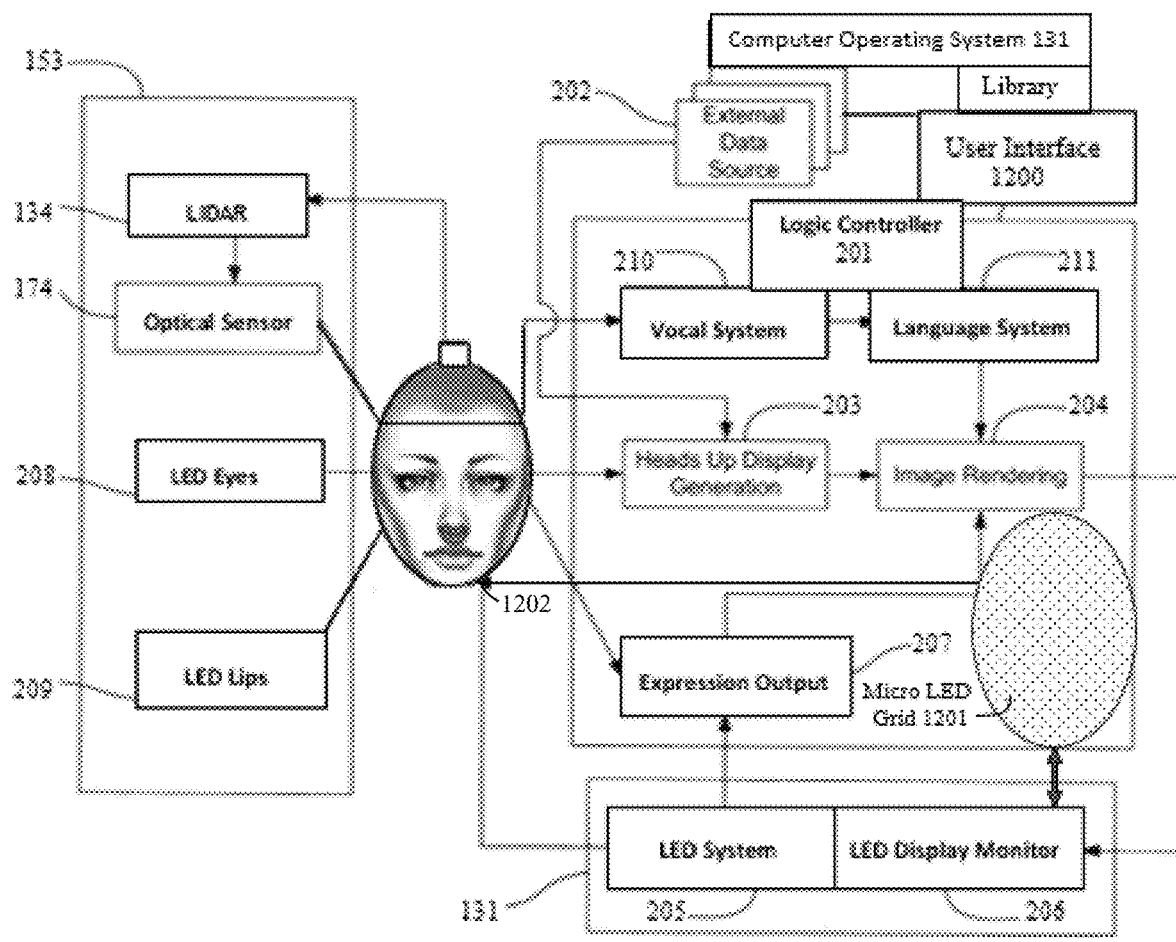
FIG. 12 schematic illustrates a block diagram of the head system and LED system in accordance with the present disclosure.

In further detail FIG. 7, FIG. 8, FIG. 9, FIG. 10, FIG. 11 and configure-ably the head system 200 of FIG. 12, the self-balancing robot system 100 comprising the following control system and communication methodologies to manage the service robot's and robot vehicles by means of; the computer operating system 131, the motion control system 132 for controlling the self-balancing system processes 157 detailed herein.

In further detail FIG. 7 the self-balancing robot system 100 comprising the following control system. The self-balancing robot system 100 comprising a gyroscopic sensor and/or MEMS, accelerometer 128 or IMU sensor 173 are utilized for balancing the robotic omniwheel 103, the gyroscopic sensor and/or MEMS accelerometer 128 or IMU sensor 173 to be situated inside the hollow yoke module, the self-balancing robot system 100 processes and methods.

i) an inclination sensor arranged to detect a state of inclination of the distance measuring sensor; and gyroscope/MEM sensors, an accelerometer or IMU sensor 173 for self-balancing event, sensor array including; a micro-electro-magnetometer system or "MEMS" also a gyroscopic unit to compensate a certain number of disturbances induced by said robot module itself (high currents circulating in the conductors, the servo motors, hip and leg actuators, arms, grippers etc.), and by a GPS circuit also incorporated within the frame and body.
  ii) one or more implement sensors are non-ionizing radiation sensors, IR sensors not shown, and others,
  iii) the omniwheel device further comprises an on-board motion sensor.
  iv) the omniwheel device further comprises: a position locating sensor, the device further comprises an on-board wireless transmitter.
  v) the robot and omniwheel devices further comprises an on-board temperature sensor.
  vi) USB 115 cable and plug connectors, and so forth.

Drive system an infrastructure logic arrangement for the drone and robot array including; microprocessors, environment detection LIDAR 134, control and combine the real-time data with existing data sets and social network feeds, wherein the one or more sensors include one or more of the following: one or more proprioceptive sensors to sense position, orientation and speed of the robot module.

vii) one or more accelerometers, one or more tilt sensors, one or more force sensors, one or more position sensors, one or more infrared sensors, one or more ultrasonic sensors and perimeter sensing methods.
  viii) one or more speed sensors, wherein the one or more sensors are adapted to provide one or more of omni-directional imaging and thermal imaging, wherein the hybrid drone/robot is associated with one or more of the following: autonomous technology, robotics, predictive analytics, autonomous operation, semi-autonomous operation, machine learning, and machine-to-machine communications.
  ix) the robot-drone hybrid system for indoor or outdoor event platforms comprising: simultaneous Localization and Mapping (SLAM) generates real time, has been attracting attention in the technical field of the autonomous moving robot. In the SLAM technique, the autonomous motion includes a distance measuring sensor such as, but not limited to, a Laser Range Finder (LRF) for event task; the robot work with other peer robots and for other event tasking such as; strategic materials handling, delivery, recovery, and also for scientific research to gather element samples.
  x) a collective tool array for task activity, including robotic module with strut housing active flex joint apparatus.

In one embodiment using SLAM (Simultaneous Localization and Mapping, Real Time Simultaneous Localization and Mapping) algorithm for three-dimensional patterning;

through digital compass where the relative coordinates that the peer to peer system of the robot system 100, turned in azimuth patterns as peer robots follow one another in parallel alignment as shown in FIG. 13. The development of these sensor technology makes the robot more intelligent, more and more functions can be realized. But the navigation of the robot is still one of the key and difficult issues, because it is a prerequisite for the robot to complete obstacle avoidance, detection and other unknown environmental tasks.

The service robots are multifunctional service robots characterized in that the robot body is containing the communication port which can include at least; a USB to TTL UART port, I2C interface, Bluetooth interface and 6Pin GPIO port, tablet PCs with Bluetooth interface to establish a Bluetooth connection, and accordingly the radio-frequency signals can be configured to receive and transmit data information associated with the operations of the robot body and of the robotic omniwheel 103, hub wheel, track wheel, or other drive wheel arrangement, and data from the computing device 170, and the wireless communications system 138, a Bluetooth connected smartphone, and other related communication devices disclosed in FIGS. 6-13.

In FIG. 7 a diagram flowchart showing the robot system 100 control systems including the computer operating system 131 managing operations of at least: the motion control system 132 detailed in FIG. 8; the autonomous drive system 133 detailed in FIG. 9; the wireless communication system 138 detailed in FIG. 10; and the I/O Interface 146 detailed in FIG. 11.

Respectively self-balancing robot system 100 service robot's 101 and robot vehicles 102 utilize the motion control system 132 for controlling the robotic omniwheel 103 inertia process; the drive motor 109 and the steering motor 113 torque, yaw and pitch momentum is calculated by the computer operating system 131 processors 147 receiving sensory system 154 data information and motor controller processors 155 immediately carry out instructions communicated by the motion control system 132 for controlling the arrays of active joint actuators situated within trunk, hip, knee, arms, etc.

In FIG. 8, a schematic process of the motion control system 132 configured to control traverse motion and holonomic motion e.g., can turn more than 360 degrees—Jll circle without any obstacle, and also to achieve level balance by means the self-balancing system 157 using the attitude sensing system 135 and state sensor 136 situated on the robotic omniwheel hub wheel 104 and also the attitude sensing system 135 and state sensor 136 placed in the robot body 119. The attitude sensing system 135 and attitude state sensor 136 and algorithm 137 e.g., pre-calculated by the algorithm 137 configured by the computer operating system 131, for the most part the attitude sensing system 135 is configured for continuously measuring and delivering the instantaneous balance control and for continuously measuring and delivering the instantaneous pitch .phi. and roll .phi..sub..tau. angle values.

In futhher detail FIG. 8 the motion control system 132 methodologies include at least: 801. The processors 147 communicate a memory configured to store programming instructions 149, and the processor configured to execute the programming instructions for the robot 101 and the robot 102, 802. The processor 176 to read and interpret LIDAR 134 codes that encode robot 101/102 location and associated data 150 as fiducials to determine sensory system 154 information and store the data in memory 148, 803. A process to receive navigation information from a satellite modem 191 configured to receive a satellite signal and to communicate the data information 150 to the robot 101 and the robot 102 via signal inputs 156, 804. A process to receive map data information from one or more GPS satellites 194, via GPS interface 184, 805. A process to receive image data from an IMU sensor 173, optical sensor 174, and sensory sensor 154 configured to capture around the robot 101 and the robot 102, 806. A process to receive distance information from a distance sensor configured to sense objects positioned around the robot 101 and the robot 102, 807. A process to determine a fusion method for information measured by the image sensor and the distance sensor based on a receiving state of the satellite navigation receiver and precision of the map data to recognize the driving environment of the robot 101 and the robot 102, 808. A process to determine a reception strength of the navigation information and to determine a precision level of the GPS mapping data of the robot 101 and the robot 102, 809. A process to extract from an object and from information measured by the LIDAR sensor 134 and the attitude sensory system 135, and the information extracted from the gyro/MEMS, accelerometers 128 used to recognize irregular balance when driving through environments; and recognize forced off balance from impact, 810. A process of the smart highway robot system 100 in real time, respectively to provide positioning information associated with a current location of robot 101 and of robot 102, and the positioning system 160 gathers the information via smart highway tags 161. A process to engage power ON to drive through environment and a process calibrate mapping path to drive and to autonomously self-dock to charge, and subsequently shut OFF power, whereby in one embodiment the motion control system 132 selects processes select a switch to power on motor controllers 117 to work, and in another embodiment the motion control system 132 selects a switch to turn power off In one aspect the attitude sensing system 135 configured with the control algorithm 137 is configured for sensing the balance of the robot 101/102, the control algorithm 137 pre-calculated by the computer operating system 131 configured for establishing the robotic omniwheel 103 direction required for balancing and amount of travel along the direction required for balancing; wherein the robotic omniwheel 103 is operatively configured to turn to a direction required for balancing and travel the amount in the direction required for balancing as to self-balance the robot 102 and to self-balance the robotic omniwheel 103.

The robot (e.g., service robot and service robot vehicle) comprising a movable means (e.g., drive wheel type array) configured to achieve vertical balance of the robot (e.g., service robot and service robot vehicle) by reducing a difference between a pitch measured by the attitude sensing system calculated at zero pitch set point at center-of-gravity and trajectory provided from the sensoring system 154 actuators and accelerometers to achieve pitch, roll and yaw motion states; the sensoring system 154 for controlling;

center-of-gravity horizontal position trajectory determining means for calculating a center-of-gravity horizontal position trajectory of the robot's balance based on the moment around a horizontal axis acting upon the robot and a temporal continuity of at least the position and speed of the center of gravity of the robot when a drive wheel is in contact with a ground surface;

center-of-gravity vertical position trajectory determining means for calculating a center-of-gravity vertical position trajectory of the robot based on vertical translational force acting upon the robot other than gravity and a temporal continuity of at least the vertical position and the speed of the center of gravity of the robot when the drive wheel is not in contact with the ground;

motion state determining means for determining a motion state of the robot so that the moment around the center of gravity of the robot and the position of the center of gravity determined by the center-of-gravity horizontal position trajectory determining means and the center-of-gravity vertical position trajectory determining means are satisfied when the drive wheel is not in contact with the ground.

A process to receive navigation information from a satellite modem 191 configured to receive a satellite signal and to communicate the data information 150 to the robot 101 and the robot 102 via signal inputs 156; 804. A process to receive map data information from one or more GPS satellites 194; via GPS interface 184; 805. A process to receive image data from an IMU sensor 173, optical sensor 174, and other sensory system sensor 154 configured to capture around the robot 101 and the robot 102; 806. A process to receive distance information from a distance sensor configured to sense objects positioned around the robot 101 and the robot 102; 807. A process to determine a fusion method for information measured by the image sensor and the distance sensor based on a receiving state of the satellite navigation receiver and precision of the map data to recognize the driving environment of the robot 101 and the robot 102; 808. A process to determine a reception strength of the navigation information and to determine a precision level of the GPS mapping data of the robot 101 and the robot 102; 809. A process to extract from an object and from information measured by the LIDAR sensor 134 and the altitude sensory system 135, and the information extracted from the gyro/MEMS, accelerometers 128 used to recognize irregular balance when driving through environments and recognize forced off balance from impact; 810. A process of the smart highway robot system 100 in real time, respectively to provide positioning information associated with a current location of robot 101 and of robot 102, and the positioning system 160 gathers the information via smart highway tags 161. A process to engage power ON to drive through environment and a process calibrate mapping path to drive and to autonomously self-dock to charge, and subsequently shut OFF power, whereby in one embodiment the motion control system 132 selects processes select a switch to power on motor controllers 117 to work, and in another embodiment the motion control system 132 selects a kill switch to turn power off motor controllers 117 to stop working.

In one aspect the altitude sensing system 135 configured with the control algorithm 137 is configured for sensing the balance of the robot 101/102, the control algorithm 137 pre-calculated by the computer operating system 131 configured for establishing the robotic omniwheel 103 direction required for balancing and amount of travel along the direction required for balancing; wherein the robotic omniwheel 103 is operatively configured to turn to a direction required for balancing and travel the amount in the direction required for balancing as to self-balance the robot 102 and to self-balance the robotic omniwheel 103.

In one embodiment the robotic omniwheel 103 configured to have a direction of travel (W) and a turning angle (Θ) between the robotic omniwheel 103 direction of travel and the fore direction, the robotic omniwheel drive motor 109 operatively configured to rotate the robotic omniwheel 103 and move the robot 102 traversely forward or backward in the robotic omniwheel direction of travel; the computer operating system 131, the motion control system 132, and the electrical control system 139 are configured for establishing a balancing robotic omniwheel 103 direction required for adjusting the robots level balance from range of power provided. The motion control system 132 establishes a balancing amount of travel along said balancing direction required for adjusting the robots 102 balance; where said robotic omniwheel 103 is operatively configured to: (i) turn to the robot 102 direction (W'), (ii) travel the balancing amount of travel (Ω) along the balancing robot direction (W'), and (iii) turn the robot 102 to realign the fore direction to the robotic omniwheel 103 direction of travel.

In one embodiment the motion control system 132 comprising a method configured for controlling the yoke or "yaw" steering motor 113 of the robotic omniwheel 103; wherein the controlling of the rotation and lateral steering of the robotic omniwheel 103 is performed the yaw direction provided by the steering motor 113, and by using the attitude sensing system 135 characterized by following steps: a method configured for continuously measuring of the robot body 119 pitch $\phi$ and yaw $\phi_\tau$ angles using an attitude state sensor 136 situated on the robot's upper body is used to achieve level balance of the robot 102, a method pre-calculated by the computer operating system 131 configured for measuring the instantaneous angle $\Theta$ of the said robotic omniwheel 103 using an attitude state sensor 136 situated therein thus a fast control module 160 and a slow control module 161, the fast control module 160 comprises at least the following sensors: (1) an attitude state sensor 136 for robot balance continuously measuring and delivering the instantaneous pitch $\phi$ and roll $\phi_\tau$ angle values, referred to as the phi-angle sensor 162, and (2) a sensor for the relative angle $\Theta$ between the body of the robot and the robotic omniwheel 103 direction, referred as a theta-angle sensor 163. In one embodiment the self-balancing robot system 100 comprising the theta-sensor 163 which is commonly implemented as an integral part of the robotic omniwheel drive motor 109, a method configured for providing a pitch angle $\phi_\rho$, a yaw angle $\phi_\Gamma$, and angle $\Theta$ as inputs to a fast control module 164 which uses the pitch $\phi_\rho$ and the yaw angle $\phi_\Gamma$ to determine a new direction W' to which the robotic omniwheel 103 has to travel to restore level balance, a method configured for establishing by fast control module 164 a turning torque $T_{WTL}$ command to be applied to the robotic omniwheel's drive motor 109, or as a difference command to the segmented the steering motor 113, or both to turn to new direction W, and a command to be applied to the steering motor 113, or as a joint command to the segmented robotic omniwheel drive motor 109 to produce the amount of robotic omniwheel rotation S2 in this new direction W', all in order to bring said pitch $\phi_\rho$ and said yaw $\phi$ angles to zero point by using the attitude sensing system 135, alttitude state sensor 136 and the phi-angle sensor 162.

In one embodiment the motion control system 132 comprising a method pre-calculated by the computer operating system 131 configured for turning the robotic omniwheel 103 to the new robotic omniwheel direction W' and rotating the robotic omniwheel by the amount of robotic omniwheel rotation Ω; a method configured for establishing by slow control module 161 a thrust torque $T_{WTL\_t}$ command to be applied to the robotic omniwheel drive motor 109 requiring trust to realign fore direction (U) to robotic omniwheel direction of travel (W).

In one embodiment the motion control system 132 comprising a method configured for turning the wheel to realign fore direction (U) to robotic omniwheel 103 direction of travel (W) and thus to restore Θ=0, where all steps are repeated; a method configured for stabilizing the robot 102 comprising steering motor 113 for controlling the steering of the robotic omniwheel 103 whereby a control algorithm 137 comprises at least three control loops: a fast rotation loop (FRL) 164, the fast turning loop (FTL) 165, and a slow loop 166 that performs fore direction correction (FDC) 167.

In one embodiment the motion control system 132 comprising a method pre-calculated process configured for the fast control loop 168 to measure the pitch $\varphi_\rho$ and roll $_\Gamma$ angles (via the phi-angle sensor 162) and the instantaneous position of the omniwheel assembly relative to the robot body Θ (via the theta-angle sensor 163), are fed as inputs to the fast control module 160. The target value for the angle Θ is zero as the rider wishes to travel forward. Generally, in the normal operation, the pitch and roll angles will be non-zero and a correction of balance will be necessary. The fast control module 160 uses the pitch $\varphi\rho$ and roll $_\Gamma$ angles to determine the direction to which the robotic omniwheel has to travel to restore balance, i.e., to bring the pitch and roll angles to zero. The control algorithm 137 results in the new angle & between the robotic omniwheel direction W and the robot body direction U and the amount of robotic omniwheel 103 rotation Ω required to restore balance. The control algorithm 137 output is fed to the robotic omniwheel drive motor 109 to track the robotic omniwheel rotation. As soon as the new robotic omniwheel direction is established in the fast turning loop (FTL) 165, the robotic omniwheel travels an amount equal to Ω as provided by the common rotation of the drive motor 109 in the fast rotation loop (FRL) 164. The fast control loop (FCL) 168 cycle repeats.

In one embodiment in as much as the robotic omniwheel 103 traversing the robot 101/102 may not be perfect every time, due to varying terrains conditions and static friction slipping thresholds, the fore direction may have to be realigned with the robotic omniwheel direction. This is accomplished with the slow fore-direction correction loop (FDCL) 167 and the slow control module 141 that applies a restoring torque $T_{FDC}$ to the restore 0=0. The response time of the FDCL 167 is slower than the response times of both the wheel trust loop (WTL) 168 and the wheel rotation loop (WRL) 169 because more than one balancing turns may happen in a short time without the need to make fore direction correction. For this reason, the loop time constant of FDCl 167 control Ts is much longer than the fast control loop 168 time constant $T_F$ A typical ratio is an order of magnitude. The fast control loop 168 time constant $T_F$ is determined by the required balancing time scale which depends on the moments of inertia of the self-balancing process 157 and is typical of the order of hundreds of milliseconds.

In further detail FIG. 9 the autonomous drive system 133 comprising a computing device 170, the computing device 170 comprising: one or more processors 147 for controlling the operations of the computing device 170; a wireless communications system 138 configured to communicate with network control system server 171 over a network system 151; and memory 148 for storing data information 150 and program instructions 149 used by the one or more processors 147, wherein the one or more processors 147 are configured to execute program instructions 149 stored in the memory 148, processor to send the data information 150 received from the one or more sensors associated with the sensory system 154, and the motor controller processors 155 input and output devices 153 relay the data information to the processor via signal inputs 156.

In FIG. 9 the motion control system 132 methodologies include at least: 901. A computing device 170 comprising: one or more processors 147, gyro/MEMS, accelerometers 128 and the status sensors 131 for controlling the service robot 101 and the robot vehicle 102; 902. An I/O Interface 146 is configured to communicate with server 171 the network system 151; and memory 148 for storing program instruction 148 used by the one or more processors 147, LIDAR processor 176, the computer device processor 177 and the data information 150 received from the wireless communication system 138; 903. One or more processors are configured to execute instructions stored in the memory to: identify an unexpected driving environment; send information received from sensors; IMU 173, optical 174, location 175, and analog sensors 178 associated with the sensory system 154 and from the attitude sensing system 135; 904. The IMU 173 configured to capture changes in velocity, acceleration, wheel revolution speed, yaw, and distance to objects within the surrounding environment for use by the computing device 170 to estimate position and orientation of the autonomous robot 101 and the robot vehicle 102 steering angle, for example in a dead-reckoning system 905. The sensory system 154 captures data representative of changes in x, y, and z-axis position, velocity, acceleration, rotation angle, and rotational angular rate for the service robot 101 and the robot vehicle 102; 906. A plethora of sensors capturing data for a dead-reckoning system, data relating to wheel revolution speeds, travel distance, steering angle, and steering angular rate of change can be captured; 907. The LIDAR sensors 134 capture intensity values and reflectivity of each point on the object to be used for analyzing and classifying the object, for example, one of the self-balancing applications 157 stored within or accessible to the self-balancing robot system's autonomous drive system's 133 computing device 170; 908. Optical sensors 158 capture images for processing by the computing device 170 used to detect traffic signals and traffic patterns, for example by capturing images of traffic lights, markings on the road, or traffic signs on common roadways and on smart highways 158, the smart highway system using proximity tags 159; 909. One or more GPS satellites 194 used to estimate the robot 101 and the robot vehicle 102 position and velocity using three-dimensional triangulation and time estimation and point cloud of the LIDAR data captured by the location system 152, the LIDAR data information via the LIDAR processor 176 is stored in the memory 148; 910. One or more processors 714 are further configured to execute instructions stored in the memory 148 to send an autonomous command and to other robots and vehicles on the road may also be communicating with and sending data including sensor and/or image data to the network server 171.

In one embodiment the sensory system 154 utilizes a plurality of sensors disposed on the robot 101/102, for example, one or more sensors include an IMU sensor 173 can be configured to capture changes in velocity, acceleration, wheel revolution speed, yaw, and distance to objects within the surrounding environment for use by the computing device 170 to estimate position and orientation of the robot 101/102 and steering angle, for example in a dead-reckoning system. One or more sensors can also capture data representative of changes in x, y, and z-axis position, velocity, acceleration, rotation angle, and rotational angular rate for the vehicle and similar data for objects proximate to the navigation route of the robot 101/102. If the sensors capture data for a dead-reckoning system, data relating to wheel revolution speeds, travel distance, steering angle, and steering angular rate of change can be captured.

A sound sensor (provided by said sensoring system) is mounted on the robot body for detecting ambient sound signals the robot, the sound sensor and the is connected to the computer operating system which receives the sound sensor information feedback; the sound sensor is attached to a front portion of the robot body to measure distance detecting an obstacle in front of the robot to the robot from the sound sensor, the distance measuring sensor and the computer operating system 126 is connected, thus said the computer operating system 131 receiving the distance measuring sensor information feedback and the data is stored in memory 148.

As another example, LIDAR sensors 134 can capture data related to laser returns from physical objects in the area surrounding the robot with ranging distances calculated by measuring the time it takes for a signal to return to the LIDAR sensor 134 and a LIDAR processor 176.

The LIDAR sensor 134 is situated on the robot 101/102 however the height of the robot can maximize the degree of scanning area. Primarily the LIDAR geospatial positional data of the instantaneous robot/vehicle position is utilized by a processor 176 to calculate based on the distance of the object from the robot and its direction from the robot; the geospatial location of the objects in the field of view; the processor 176 and the autonomous drive system 133 can run on a Linux operating system, and the system algorithms can be programmed in Java programming language.

In various aspects using algorithms, users will be able to view the robot through the central PC monitor 141. The head systems image rendering device will determine by physical or nonphysical Computer-Generated-Imagery (CGI) feedback via a range finder scanning LIDAR processor system 176 disposed on the head 122 to scan a surrounding area of the robot's physical environment; the local computer data signal 186 or positioning system is to identify the position of robot relative to said physical environment and to determine the orientation and motion of users relative to said environment. The LIDAR processor system 176 is communicatively coupled to the head system 200, the local positioning system, and the orientation and motion system, the processor configured to: generate a virtual map of the surrounding region based on data obtained from the scanning system; generate an augmented reality for the virtual map based on the user's position, orientation and motion within the physical environment based on data obtained from the local position system and the orientation and motion control system 132.

In one aspect the smart highway robot system 158 (navigation path) controls the operation of one or more service robots 101 and robot vehicles 102 respectively when driving on a smart highway or common roadway can utilize one or more sensors to detect traffic signals and traffic patterns, for example by capturing images of traffic lights, markings on the road, or traffic signs. For example, optical sensors 174 can capture images for processing by the computing device 170. As an example, by using the optical sensors 174 to read the lane markings on a road and can determine where the proper travel lanes are on that road (i.e., the space between two sets of lane markings). As another example, using text recognition processing, one or more optical sensors 174 can read traffic signs that state the legal speed limit on each road. This information can be used by the computing device 170 when operating the service robot 101 and the robot vehicle 102 in autonomous mode, as described below. In addition, the optical sensors 174 can be configured to capture single- or multi-spectral image data of the driving environment. One or more location sensors 175 can capture the position of the service robot 101 and the robot vehicle 102 in global networking systems; e.g., wireless I/O control methodology is achieved through the autonomous drive system 133.

In one embodiment the autonomous drive system 133 is configured to process and calculate the functions of the autonomously controlled service robot 101 and robot vehicle 102, in this process the computing device 170 is operable electrically or otherwise is coupled with the autonomously drive system 133, the motion control system 132 and to mission-specific sensors within a common location determination architecture of the self-balancing robot system 100.

In further detail FIG. 10 the wireless communication system 138 is configured to be in communication with the self-balancing robot system 100 in real time, respectively to provide positioning information associated with a current location of robot 101 and of robot 102, respectively the Wireless Communication System 138 process methodologies comprising:

1001. The robot 101 robot and vehicle 102 I/O Interface 146, locator device 152, wireless network 192, GPS satellite, Internet 195 and the operating system microprocessors 185, a bus interface 196 connect to an analog telemetry interface 176 and a digital telemetry interface 177 which connect to the network system 151;

1002. The analog telemetry interface, provides a connection 193 to a plurality of analog sensors and microprocessors configured to generate variable voltage signals to indicate their status, along with a RS232 interface 183 and radio/RF interface 182;

1003. The analog sensor is a thermometer which outputs temperature measurements as a voltage graduated analog signal;

1004. The analog telemetry interface 176 includes an analog-to-digital (A/D) converter 179 which converts received analog signals to their digital representations that can be further processed by microprocessors 185;

1005. The digital telemetry interface 177 provides a bidirectional connection to device 193 controlled by various digital input signals 180 and output signals 181 to and from interface bus 196;

1006. The radio interface 182 is further used to receive a remote computer data signal 187 from the network control system 151. The RS232 interface 183 provides a primary serial connection to RF interface 182;

1007. The digital output 181 is a relay which controls some operational aspects from location devices sensors 152;

1008. The bus interface 196 provides a bidirectional connection 189 to various computer systems, the data signals remotely 187 and locally 186 connecting to the satellite modem 191 and to GPS interface 184;

1009. The satellite modem 190 bidirectional connects 197 to the wireless network 192 via the RF interface 182, respectively for sending instructions respective to trajectory data 160-169;

1010. The wireless communication system 131 sending instructions respective to trajectory data to the bus interface 196 preferably by means of predetermined radio interface 182, and to wirelessly connect the Internet 195 the process is configured by the computer operating system 131.

Primarily the computing device processor 177 is configured to execute instructions stored in the memory 148 based on a quality metric of a network interface system 151 wherein, the information sent over a network control system server 171 is based at least in part on a quality metric of the network system 151. The network system 151 including one or more processors 150 are further configured to execute instructions stored in the memory 148 to send an autonomous command to one or more autonomous robot systems 100 based on a quality metric of the network system 151 and by the wireless communication system 138.

In one aspect the computer operating system 131 has redundant I/O interface manager 146 for managing communications between an incorporating computer operating system 131 and an external system such as a network system 151 or multi-port disk array, not shown. A redundant I/O interface manager 146 directs communication through one of the redundant I/O interface modules, switches the communications through the other, e.g., when a failure of the first I/O interface module is detected or predicted. The redundant I/O interface module appears to the computer operating system 131 of the incorporating system as the first I/O interface module would so the switching is effectively invisible to the computer operating system 131 via the network system 151 see FIG. 11 herein.

In further detail FIG. 11 shows a prospective block diagram of the wireless communication system 138 configured to utilize the I/O interface manager 146 incorporating the network system 151, the block diagram showing system processes comprising herein: the network server 171, a location device sensors 175, a plurality signals from GPS satellites 194, the Internet 195, and computer subsystems including; computer device 170, processors 147, a bus interface 196 which is connect to an analog telemetry interface 176 and a digital telemetry interface 159 which connect to the network system 151. The analog telemetry interface 1176 provides a connection to a plurality of analog sensors 178 configured to generate variable voltage signals via local computer data signals 186 to indicate their status, along with a radio/RF interface 182 and the RS232 interface 183.

In one or more embodiments the I/O Interface system utilizes the analog telemetry interface 176 sensor as a thermometer which outputs temperature measurements as a voltage graduated analog signal, and the system utilizes GPS interface 184, and also the I/O Interface system utilizes a plurality of microprocessors 185. The analog telemetry interface sensors include an analog-to-digital (A/D) converter 179 which converts received analog signals to their digital representations that can be further processed by microprocessors 185. The digital telemetry interface 177 provides a bidirectional connection to said devices controlled by various digital input signals 180 and digital output signals 181, also, to and from bus interface 196. The radio interface 182 is further used to receive a remote computer data signal 187 from the network system 151. The RS232 interface 183 provides a primary serial connection to RF interface 181. The digital output signals 181 is a relay which controls some operational aspects from location devices 175 having one or more sensors. The robot bus interface 196 provides a bidirectional connection 197 to computer systems data signals remotely 187 and locally 1186 thus connecting to the satellite modem 191. The satellite modem 191 bidirectional connects 197 to the network system 151 via the RF interface 182, respectively for sending instructions respective to trajectory data 160-169. The wireless system respectively for sending instructions respective to trajectory data 160-169 to the autonomous drive system 133, and preferably via a predetermined radio interface 182 wirelessly connects the Internet 195. In one aspect the process is configured to and from the wireless network system 151 computing device 170 communicating to and from the computer operating system 131, and audio devices providing microphone and speaker 199 for user interface.

In various aspects the computing device 170 comprising: one or more processors 147 for controlling the operations of the computing device 170, and the communications I/O Interface system 146 is configured to communicate with a server 171 via the network system 151; and utilizes memory 148 for storing data information 150 from program instructions used by the one or more processors 147, the one or more processors 147 are configured to execute programmed instructions stored in the memory 148 and to identify an unexpected driving environment; send information received from one or more sensors associated with the sensory system 154.

In various aspects the location device 175 is a wireless communication device commonly installed in robots to provide location-based communication services such as, for example, asset tracking and reporting. The Internet 195 with data storage which is utilized for user access, communications, and telemetry monitoring and/or control. The bus interface 196 enables communications between the location device 175 and other devices herein, integrated or external the methods include at least: a bus interface 196 which includes the analog telemetry 176 interface to provide a connection 193 from a plurality of analog sensors 178 to generate variable voltage signals to indicate their status. A common example of an analog sensor is a thermometer. The analog telemetry interface can include an analog-to-digital (A/D) converter to convert received analog signals to their digital representations and be further processed by microprocessors 185. The RS232 interface 183 provides a primary serial connection. The wireless communication system 138 respectively for sending instructions respective to trajectory data 160-169 to the motion control system 132 preferably via a predetermined radio frequency 182.

A common example of a device connected to the digital output 181 is a relay which controls some operational aspect of the robot system 100 in which it is installed, for example; a compartment roll top door-mounted motor which generates a logic HIGH signal when a compartment door opens un-expectantly, or other example when recharging the batteries 140, the robot system is receiving a logic HIGH signal from the digital telemetry interface 177 alerting the battery is charged, this process is not shown.

The robot system 100 bus interface 196 provides a bidirectional connection to various drivers, the bus drivers include a wireless driver which enables communications to/from the wireless network 151.

In further detail FIG. 12 illustrates a block diagram of the articulated head system 200 configured with various systems, processes, and contrivances which include at least: a logic controller 201, an external data source 202, a heads up display 203, an image rendering module 204, a LED system 205, a LED display monitor 206, an expression output module 207, a LED eye formation 208, a LED lip formation 209, a vocal system 210, and a language system 211. As illustrated the head system 200 comprised within the robot head 122 section, accordingly the head 122 is comprising a method to be attached by the neck 123 by means of coupling 127(N) which is fabricated during the manufacturing process. The head system 200 is configured to interact with users by verbally communicating whereby the head system 200 is primarily a subsystem controlled by the computer operating system 131 utilizing an optical sensor 171, and other devices described herein.

As shown in FIG. 12, the head system comprising a LED system the LED system includes a pre-programed algorithm within the computer control system 131. The LED system achieves a means via user creative input for displaying special effects inside the head 122, the LED system is contained within the head, the is configured to contain a LED display monitor 206, thereby the users can view the images on the outside of the head, the head further comprising: a transparent plastic form having the shape of a human face, the form comprising an upper section and a lower section respectively to house the following head system components disclosed herein. The LED display monitor 206 is configured for displaying images with life like interactive facial expressions via a computer-generated process having different scenarios via preprogrammed instructions. The flexible micro LED grid 1201 is affixed to the inner contours of the head 122, respectively the flexible micro LED grid 1201 is fabricated with an opaque silicon component this process is produced by the manufacture. The LED grid 1201 comprising wiring connections and USB cable for connecting the micro LED grid (see oval form with wired grid 1201), the prewired grid is also prewired to the LED display monitor 206, and also the internal computerized LED display system is to include pre-programmed special effects software, and also to include a library of computer generated faces configured with different eyes, eye brows, lips, nose, ears and hair.

The logic controller 201 configured to receive video signals from external data sources 202 via devices. Examples of external data sources 202 include one or more video cameras 198 that are disposed external to the service robot 101 body and the robot vehicle 102 cargo container 143. In various aspects the video camera 198 signals are then provided to image rendering logic 204 of said logic controller 20 land user interface system 1200. The logic controller 201 includes a means to communicate logic data and instructions to the heads up display 203 via the computer control system 131 and accordingly the logic data information is generated from one or more external data sources 202.

In one embodiment the heads up display 203 generation logic data can be visually displayed on the heads LED display via the LED system 205 for user interfacing. The heads-up display, in some embodiments, provides a dashboard-style representation to represent such information. The heads-up display produced by the heads-up display generation logic is also provided to the image rendering logic 204.

The logic of the controller 203 also to receive signals from image rendering logic 204 to determine a portion of the video signals from the video cameras 198 that will be rendered as an image to the display generation logic.

In order to generate the user view of data information, the robot's space is defined as having a frame of reference fixed to the robot, such as to a location of the head 122 of the robot. The logic is configured with for each video camera 198 such as the spatial coordinates that define the camera's position and aim in real space relative to the frame of reference fixed to the robot. Such information can also comprise the properties of the camera's lens (e.g., wide or narrow angle) that together with the spatial coordinates defines a field of view of the video camera 198 in real space, such as the fields of view, and similarly defines the corresponding view for the video camera 198 relative to the same frame of reference within the robot space.

As different scenarios are utilized by the robot system 100 the methodologies of the head system may comprise the following embodiments and their functions; a field of view of a video camera 198 which is a representation of that portion of the robot's visual environment that is received by at least one video camera 198. As used herein, a view in a virtual space, such as the robot space, is a representation of a hypothetical projection of the video signal from a point in the virtual space onto a screen at some distance from that point via a computer logic 212 controlling means. Since computer logic 212 is configured with the information noted above, the logic is able to construct views in the robot space that have the same spatial relationships as the fields of view of the video cameras. Accordingly, where fields of view such as overlap in real space, the corresponding views of the video cameras in the robot space also overlap.

In one embodiment the articulated head system 200 including an input device or image recognition 214 as a general camera and the video camera 198 are placed accordingly on the robot and installed as an input device or as a general a video camera 198, or secondary camera for video use for the image recognition, the cameras are connected to the robots computer operating system 131 wherein: the computer operating system 131 via wireless network 192 is connected to a third-party software share data API interface or other software developers.

In one embodiment the articulated head system 200 is including a vocal system 210 and a language system 211 an expression output 207 of life like actions of emotion whereby to be expressed by the LED eyes 208 and by the LED lips 209, respectively this action is achieved by means of a LED system 205 and a LED display system 206.

The robot body compartment 130 is configured for playing music, the compartment 130 is comprising one or more speakers 199, and the LED system 205 is situated inside the heads lower section, wherein LEDs lights are connected to the computer operating system 131. The mounted speakers 199 and LED lighting are synchronized to the expression output 207 of the LED display system 206 to coincide with the vocal system 210 and language system 210, and also the eyes 208, and the LED lips 200, and the audio speaker/microphone 199 for the voice is situated within the PC monitor's 141 devices.

In one aspects the articulated head system 200 is including a vocal system 210 and a language system 211 an expression output 207 of life like facial movement and e.g., the language system 211, interactive user devices 197 including bidirectional communication devices.

In one embodiment modular LED light units of the LED system 205 are utilized for displaying special effects via the micro LED grid 1201, the articulated head system for displayed computer-generated images on a computerized visual face monitor, shown in FIG. 12, the grid illustrates a flexible facial form configured with a wired pattern of LED lighting.

In one aspect the articulated head system 200 is configured with a transparent plastic having the shape of a human face, and furthermore the head 122 sections comprising; the computerized micro LED grid projects a visual face on the display monitor respectively this action is achieved by means of a LED system 205 and a LED display system 206. The unexposed visual face monitor comprises operation process to optically project special effects imagery inside the head, and these images to then be seen from outside by users, respectively the face monitor screen is utilized for displaying images in real time, the simulated imagery is developed by user via a computer-generated, accordingly custom images and characters of faces can be selected by user from a library database and from on line sources and video camera 198 images, thusly their digital representations can be further processed by microprocessors 185 achieved within the computer control system 131, different scenarios apply.

In one or more aspects the articulated head system 200 is comprising wherein the computerized visual face monitor with life like interactive facial expressions wherein, a computerized optical projection system using an internal computerized LED display system 206 works accordingly to display computer generated facial expression via the facial expression output system 207 which includes pre-programmed special effects software including a library of computer generated faces configured with different kinds of eyes, eye brows, noses, lips and ears and other characteristics.

In one or more aspects the articulated head system 200 is comprising wherein; a computer-generated process via logic controller 212 and user interface system 1200 and the LED display system 206 are capable of displaying patterns of various colors including; red, yellow, blue, green, and so forth, which are projected through the upper and because of the opaque silicon component, the grid is wired via wiring connections 116 and the USB 115 is lower transparent plastic sections of the head 122. The LED display system 211 further comprises a micro LED 1201 grid situated on an opaque layer of flexible heat resistant silicon. In one embodiment the flexible micro LED grid is affixed to the inner contours of the head 122, respectively the flexible micro LED grid in barely visible connecting the micro LED grid to the LED display system 206.

In one embodiment the LED display system 206 is capable of depicting variety of faces at least that of female facial features (e.g., shown in the drawings of FIG. 1, FIG. 2, FIG. 4, FIG. 5 and FIG. 12) and also the robot can have male facial features. Accordingly, in various aspects the female face or male face can be life like animated characters and graphic shapes, and the ears include life like earrings via a computer-generated process, and as well the LED display system 206 is capable of depicting various lengths of hair actively flowing in life like motion, the hair may change colors via a computer-generated process via logic controller 212 and user interface system 201, different scenarios apply.

One or more methods of the head system 200 including the head 122 is to comprise a LED facial display system 206 which may utilize bidirectional input and output devices 197 such as; WIFI, Bluetooth, and other various satellite and telecommunication elements including; at least one computing platform associated with one of a smartphone device, and computerized interactive information devices such as devices known as "Alexia™" or "SIRI™" or other built-in "intelligent assistants", and also one or more network interface servers and buses, and so forth, the robot input and output communication devices and intelligent assistants are not shown in FIG. 11. In various elements, the Bluetooth smartphone connection to receive and transmit data information associated with the operations of the service robot and to the store information as memory data. information including associated with the operation of a communication port connecting to a PC monitor, and at least one computing platform associated with one of interactive user interface computing information via an intelligent assistant utilized as a means to assist user by visual and verbal communication, the intelligent assistant to assist user with tasks and assist user to actively control the actions of one or more service robots and service robot vehicles.

In one or more aspects the articulated head system 200 is comprising wherein one or more internal communication systems communicatively coupled to a peer robot via wireless communication, wherein processors accordingly via an identifier system 214 recognize a fellow robot peer and convey information related to a configuration of other peer robots via a computer-generated process and relay the data information 150 to the user's PC monitor 14, this process is also shown in FIG. 13 via a means using proximity tagging 161.

In further detail FIG. 13 the smart highway positioning system 158 configured with a wireless communication system 138 configured to be in communication with the self-balancing robot system 100 in real time, respectively to provide positioning information associated with a current location of robot 101 and of robot 102 traveling on the smart highway system 158. The smart highway system 158, for example gathers the robot vehicle 102 position information by proximity tags 161, and respectively the smart highway positioning system comprising the positioning information relayed from a plurality of real time-dependent smart highway proximity tags 161, proximity tags 161 are sensors that would preferably be embedded in or alongside the road surface (e.g., on either opposing sides as shown) in or alongside the lanes.

In several aspects the proximity tags 161 obtain data about the road surface and also obtain data information about the robots 101/102 as the data is being directed to transmitters for transmission to the smart highway control network (e.g., upon the smart highway control network when it is established this processor is achievable). The data information 150 pertains to transmitting information to robots 101/102 from infrastructure-based transmitters, and each proximity tag 161 being dependent on a data structure is comprising spatial coordinates locatable relative to the GPS map and tag data information relayed from robots 101/102, wherein the spatial coordinates are associated with the robots 101/102 autonomous drive system 133 I.D. code is recognized by a smart highway control network (once established). This process is configured for smart highway registration tags would scan the robots 101/102 identification code like a license plate number only digital, this process determines the owner of the robot and aforesaid processes are not shown. The robot system 100 service robots 101 and robot vehicles 102 will be required to have an I.D. respectively the coding system will be handled by an agency like the "Department of Motor Vehicles", accordingly when established the robot 101/102 registration fee is surely a requirement (e.g., as per drone regulations).

In one aspect when a significant number of vehicles have the capability of operating in a fully-autonomous manner, then dedicated smart highway lanes for just service robots 101 and robot vehicles 102 and also for autonomous passenger vehicles which are all operating on the smart highway lanes and can all travel in close-packed in high speed cavalcades (e.g., as shown 101(A)a-101(A)c). Accidents in these lanes will not occur and the maximum utilization of the smart roadway and smart highway infrastructure is certainly a safer system than present day roadway infrastructure.

In one aspect the smart robot vehicle 102 whilst driving on smart roadways and smart highways can utilize the Internet 195 and wireless communication system 138 methodologies for conveying information to and from a plethora of service robot and service vehicles traveling on the same pathway. Methods can include a robot vehicle 102(A) to a robot vehicle 102(B) through a fixed structure as the robot vehicles travel along smart roads, comprising a method for: generating information about external conditions around the robot vehicle 102(A) using a robot/vehicle-based data generating system; and using at least one of a plurality of transceivers that use a long range system to wirelessly communicate with the robot vehicles as the first and second robot vehicles travel along the smart roads/highways and that provide a ubiquitous Internet along a network of roads along which the service robots may travel. The communications system on the service robots and robot service vehicles to transmit the generated information about conditions at least one of the transceivers using the smart roads/highways system 158 method and the robot systems 131-133 and the Internet 195 and wireless communication system 138.

In another aspect the smart robot vehicle 102 whilst driving on roadways and smart highways can utilize s wireless communication method for conveying information from said service robot 101(A) to said service robot 101(B) through a fixed structure as service robots travel along a road, comprising a method for: generating information about external conditions around service robot 101(A) using a robot vehicle-based data generating system not shown; and using at least one of a plurality of transceivers that use a long range system to wirelessly communicate with service robot 102(A) and service robot 102(B) and service robot 102(C) travel along the smart road/highway in a cavalcade and that provide a ubiquitous Internet 195 along a network of smart roads/highways along which the robot vehicles may travel and a first communications system on service robot 101(A) to transmit the generated information about conditions around service robot 101(A) from service robot 101(A) to a second communications system on service robot 101(B), to transmit generated information about conditions around service robot 101(A) to service robot 101(B) and then to service robot 101(C), and so forth, via at least one of the transceivers using the smart highway system 158 method and robot systems 131-133 and the Internet 195 and wireless communication system 138 as described herein.

Respectively to prevent the robot obstacle collision avoidance, the autonomous drive system 133 utilizes an array of sensors for obstacle avoidance the sensing array includes at least that of; IMU sensor 173, LIDAR 134, optical sensor 174, location sensor 175, and positioning system tag sensors 161. The autonomous drive system 129 computing device 170 is connected to the obstacle avoidance sensors to receive data information feedback via processors 147, communication interface 151, and the data is stored in memory 148.

It will be understood that the arrangement of components may vary. The wireless communication system 138 is detailing the process configured for a plurality of communication devices operable to wirelessly communicating with one or more robot and autonomous vehicles which work in conjunction with a global positioning system or GPS satellite location system 188 to determine a course for the robot system 100 to reach an objective while detecting and avoiding obstacles along the course. Wherein said communication devices wirelessly communicate with a remote server of said communication system; and wherein said remote server 171 receives map data information from GPS satellite 194 pertaining to one or more robots and, responsive at least in part to the received data information 150, receptively the remote server communicates information to of one or more robots via wireless communication devices such as; the Internet 195 and input/output devices 153 such as; video cameras 198, and also bidirectional communicating devices 192 from microphones and built in smartphone connected to WIFI,/Bluetooth 197 and other means, shown in FIG. 11.

The self-balancing system 100 comprising process methods configured to determine, based on the received sensor data, at least one object of the environment that has a detection confidence below a threshold, wherein the detection confidence is indicative of a likelihood that the determined object is correctly identified in the environment; and based on the at least one object having a detection confidence below the threshold: communicate, from the received data, image data of the at least one object for further processing to determine information associated with the at least one object having a detection confidence below the threshold and process received information data from the autonomous control sensory system 154 providing the object indication data. For example, the sensory system 154 may include infrared sensors, RADAR sensors, ultrasonic sensors, infrared sensors, and so forth, any of which may be used alone or in combination with other control system processors and sensors described herein to augment autonomous robot 101 and robot vehicle 102 navigation.

In one embodiment, the steering system for the robot vehicle 102 utilizing two robotic omniwheels may include an electrically-actuated rack-and-pinion steering system coupled to a plurality of the robotic omniwheels to control the orientation of the one of the robotic omniwheels and thus control the direction of travel of the robot vehicle as shown in FIG. 13.

In one embodiment a robot cargo vehicle 102(C) comprising four-wheel drive is capable of supporting the weight of the vehicle and the cargo, the steering motor 113 steers the robot cargo vehicle 102(C), as shown.

In other embodiment the cargo vehicle is powered by a propulsion system which can include an array of common trucking wheels controlled by a steering system in perspective a rack and pinion steering method, this method is not shown.

In yet other embodiment the robot cargo vehicles 102B and 102C shown in FIG. 13 are powered by a propulsion system which can include using a set of motorized wheels comprising an electric hub motor however, the wheels are attached to opposing front and rear axles 110.

With regard to the processes, systems, methods, heuristics, etc. described in the above mentioned, it should be understood that, although the steps of such processes, etc. have been described as occurring according to a certain ordered sequence, such processes could be practiced with the described steps performed in an order other than the order described herein.

The robot 101 and may include an array of one or more frame and body types, modular attachable and detachable contrivances in any order; an articulated head, a neck, shoulders, arms, legs, a hand, a foot, and other appendages capable of gripping objects, and as well the robots 101 and robot vehicles 102 further comprising: one or more of the following mobile platforms: a uni-wheeled mobile platform, a bi-wheeled mobile platform, a tri-wheeled mobile platform, a quadrat-wheeled mobile platform, a fifth-wheeled mobile platform, and so forth. The platform provides a balancing means and a steering means. The one or more leg comprise joint actuators provide a pivoting means for controlling swaying balance for traverse biped walking motion and skating motion. The one or more legs comprise an attachment means to couple on a drive wheel arrangement comprising at least that of: a robotic omniwheel, a hub wheel, a track wheel, and accordingly, each wheel arrangement providing traverse traveling methods for ascending, descending and a braking means.

An array of sensor configured to detect events or changes in an environment and to report status of the process functioning the variety of sensors include accelerometer sensors, and various tactile sensors placed on the frame, body, and sensors within various contrivances.

The PC monitor 141 comprises communication interface 151, the PC monitor to set on the robot body 119 such as set on the torso, the PC monitor 141 comprised one or more compositions to optically project LED and pixel imagery via a computer-generated process provided by user interface 1200 for developing creative design input, and a method of one or more special effects composition or other means forming the constituent to optically project LED and pixel imagery.

At least one power generation comprising control subsystems for external and internal environment usage including; a rectenna power system for providing continuous power supply when mobile, and piezoelectric power generation, a wireless charging station, port, or dock, and other power supplying methods when idle, the methodology can be utilized to charge the service robot and service robot vehicle batteries, and a means for a peer robot and a user to exchange the spent battery for a freshly charged battery as needed, this process is not shown.

It further should be understood that certain steps could be performed simultaneously, that other steps could be added, or that certain steps described herein could be omitted. In other words, the descriptions of processes wherein are provided for the purpose of illustrating certain embodiments of the diagrams and flowchart scheme and should in no way be construed so as to limit the claims.

Accordingly, it is to be understood that the above description is intended to be illustrative and not restrictive. Many embodiments and applications other than the examples provided would be apparent upon reading the above description. The scope should be determined as set forth above and may encompass multiple distinct inventions with independent utility. Although each of these inventions has been disclosed in its preferred form, the specific embodiments thereof as disclosed and illustrated wherein are not to be considered in a limiting sense, because numerous variations are possible.

What is claimed is:

1. A self-balancing robot system comprising:
   a first service robot, a second service robot vehicle characterized as having a level of artificial intelligence architecture configured to interact with users and to achieve autonomous drive control;
   the first service robot comprising: a humanoid body structure having multiple sections, a propulsion system, a frame, a head, a neck, shoulders, two jointed arms attached to robotic hands or grippers, a disjointed waist, one or more hip joints and legs with joint actuators, accelerometers and controllers for providing controlled pivoting and bending motions;
   the propulsion system providing one or more drive wheel arrays associated with a robotic omniwheel, a hub wheel, a track wheel;
   wherein the drive wheel arrays comprising at least that of; a drive motor having an axis of rotation, a motor controller, a yoke module comprising one or more yoke arms configured with USB power cable, IMU sensor, a state sensor, an attitude sensing system, wire connectors and couplings;
   wherein the head and the humanoid body comprising:
      said IMU sensors, attitude sensing system and attitude state sensor to achieve pitch balance by means of trajectory algorithms, thus keeping the first service robot upright and vertically balanced; an array of sensors and cameras to scan surrounding environments;
      wherein the head further comprising sections to house an articulated head system configured with a LED system providing a micro LED grid to project computer generated imagery within the head;
   wherein upper, middle and lower sections configured with one or more compartments providing access doors for containing one or more control system components including; a PC monitor associated with a computer control system with processors, a motion control system, an autonomous drive system, a wireless communication system comprising an I/O system, processors, WIFI/Bluetooth, and a smartphone control system;
   an electrical control system, a replaceable battery bank, a battery charger, and a connection means for furnishing power to electrical system components;
   the second service robot vehicle comprising frame sections, a chassis to attach a drive wheel arrangement onto one or more axles, a cargo container with one or more compartments with access doors, a section for containing one or more control system components including:
      a computer control system with processors, a motion control system, an autonomous drive system, a wireless communication system comprising a I/O system processes including WIFI/Bluetooth smartphone control system;
      an array of sensors, LIDAR and cameras disposed on the cargo container to scan surrounding environments; an attitude sensing system comprising an IMU state sensor to achieve pitch balance of the second service robot vehicle by means of trajectory algorithms to keep the second service robot vehicle vertically and horizontally balanced;
      an electrical control system, a replaceable battery bank, a battery charger, and a connection means for furnishing power to electrical systems;
      an electrical connection to an electric propulsion system or a hybrid propulsion system;
      wherein a drivetrain with axles supporting the weight of the cargo container, of cargo, and the weight of batteries, fuel or both;
   wherein the first service robot and the second service robot vehicle each comprising a user interface system linked to a PC monitor device, the user interface system utilized for communication between service robot systems and the interaction of a personalized intelligent assistant.

2. The self-balancing robot system according to claim 1, further comprising artificial intelligence characterized by the robot level of artificial intelligence architecture is to learn new behaviors and create new behavior sequences autonomously and to interact with a dynamically changing environment in real time and also to interact with users.

3. The self-balancing robot system of claim 1 in which the first service robot further comprising:
   an upper section and head configured having one or more LIDAR sensor and sensoring system components; the head's articulated head system configured to display facial characteristics, graphics and video images; one neck, at least two jointed arms, hands or grippers with joint actuators
   a mid-section including one or more compartments for housing wherein; the computer control system, processors, the motion control system, the autonomous drive system, the wireless communication system, the electrical control system, the battery bank and the battery charger with wiring connections;

a lower section including one or more jointed legs for providing a balancing means and a steering means associated with joint actuators, wherein joint actuators providing a pivoting means allowing the first service robot to achieve traverse biped walking and skating motions;

wherein the one or more jointed legs further comprising an attachment means to couple on the drive wheel arrangement thereon;

a drive wheel arrangement for providing traverse traveling, ascending, descending, and a braking means, the drive wheel arrangement associated with one or more robotic omniwheels, hub wheels, track wheels.

4. The self-balancing robot system of claim 1 in which the second service robot vehicle further comprising:

a chassis to attach to one or more axles for supporting a drive wheel arrangement associated with one or more robotic omniwheels, hub wheels, track wheels;

wherein the one or more axles for supporting the weight of the cargo container and the weight of cargo;

wherein the cargo container comprising least one LIDAR sensor, video cameras and sensory system components to be set on the cargo container;

one or more compartments for housing the computer control system with processors, the motion control system, the autonomous drive system, the wireless communication system, the electrical control system, the battery bank and the battery charger with wiring connections;

LED lighting.

5. The self-balancing robot system of claim 1 in which the autonomous drive system further providing:

to achieve robot mobility to drive indoors and drive outdoors and drive on smart highways via autonomous control sensors associated with LIDAR, cameras, GPS satellite mapping utilizing a network interface system with I/O wireless communication system processes including WIFI/Bluetooth smartphone providing a control system in communication with the autonomous drive system;

a processor configured to generate drive instructions to cause the autonomous drive system to move the service robot along a smart highway navigation path;

a mapping module in communication with the motion control system;

GPS configured to access a map data source, the map data source including a map representative of an operating environment;

a smart highway positioning system in communication with the autonomous drive system, respectively the smart highway positioning system configured to provide positioning information and identification associated with a current location of the one or more service robots connected with a smart highway positioning system;

the smart highway positioning system comprising an array of real time-dependent smart highway navigation tags, each real time-dependent navigation tag being a data structure comprising spatial coordinates locatable relative to the map and tag data information, wherein the spatial coordinates are associated autonomous drive system operational processes.

6. The self-balancing robot system of claim 1 in which the robotic omniwheel of the first service robot, the second service robot vehicle further comprising:

a steering actuator associated with a drive motor, the steering actuator and drive motor configured to achieve vertical balance of the robot by reducing a difference between a pitch measured by the attitude sensing system calculated at zero pitch set point at center-of-gravity;

the drive motor preferably comprising an electric hub motor of the first service robot, of the second service robot vehicle or a hybrid electric motor integrated with a fuel motor of the second service robot vehicle;

wherein the robotic omniwheel further comprising actuators and accelerometers configured to achieve pitch and yaw motion states;

wherein the yoke module to contain USB communication and USB power cable and wiring connections;

wherein a connection means configured for USB power cable and wired connections to furnish electric power directly to the robotic omniwheel's yoke module's steering motor;

wherein the yoke module configured to couple onto the lower section of the steering actuator and the drive motor, the yoke module configured with an upper section to attach to the upper section of the base of the first service robot lower body section or the jointed leg;

wherein the yoke module configured to couple onto the lower section of the steering actuator and the drive motor, the yoke module configured with an upper section to attach to the upper section of the base of the second service robot vehicle's chassis;

a connection method configured to connect the yoke module's wiring to the electrical control system wherein electric power is furnished to the robotic omniwheel's drive motor;

the attitude sensing system calculated at zero pitch set point at center-of-gravity and trajectory provided from the sensing system actuators and accelerometers to achieve pitch, roll and yaw motion states; the sensing system for controlling; the center-of-gravity vertical and horizontal position trajectory determining means for calculating a center-of-gravity position trajectory of the robot's balance based on the moment around a horizontal axis acting upon the first service robot, the second service robot vehicle and a temporal continuity of at least the position and speed of the center of gravity of the first service robot, the second service robot vehicle when a drive wheel is in contact with a ground surface.

7. The self-balancing robot system of claim 1 in which the attitude sensing system is further configured to achieve vertical balance of the first service robot, the second service robot vehicle to reduce a difference between a pitch measured by the attitude sensing system and a zero pitch set point, and configured having one or more trajectory methods operatively calculated to control: a lateral steering motion and trajectory; a direction of travel (W) and a turning angle (8) to move the drive wheel traversely in multiple directions; the sensing system having sensors capturing data for a dead-reckoning system, data relating to drive wheel revolution speeds, travel distance, steering angle, and steering angular rate of change can be captured; actuators and accelerometers to achieve pitch, roll and yaw motion states of the first service robot, the second service robot vehicle.

8. The self-balancing robot system of claim 1 in which the motion control system is further configured for establishing a balancing robotic omniwheel direction required for adjusting the balance and a balancing amount of travel along control system sensing a balance is operatively configured to:

(i) turn to the balancing robotic omniwheel trajectory direction;
(ii) travel the balancing amount of travel (Q) along the balancing robotic omniwheel direction (W1);
(iii) turn the service robot to realign the fore direction to the robotic omniwheel direction of travel;
(iv) the robotic omniwheel turns full circle without any restrictions.

9. The self-balancing robot system of claim 1 in which the first self-balancing robot configured having an upper, middle and lower body sections comprising a compartment including a digital locking access door, an array of LED lights including turn signal lamps, indicator lamps situated on the head and body, and brake lamps.

10. The self-balancing robot system of claim 1 in which the control system of the first service robot and the second service robot vehicle further comprising:
a computing device, wherein the computing device arranged to:
   receive a command from a command module remote to the computing device, the command containing at least one instruction which is arranged to, when executed by the first service robot, the second service robot vehicle;
   effect an operation on the first service robot, the second service robot vehicle;
   establish identification information identifying at least one characteristic of the first service robot, the second service robot vehicle, user and the environment in which the first service robot and the second service robot vehicle operates;
a processor and a database; the processor being arranged to receive the command and the identification information and review the command and the identification information against information in the database to determine whether the command is suitable for execution by the first service robot, the second service robot vehicle, wherein the command is provided to the service robot only if the command is suitable for execution.

11. The self-balancing robot system of claim 1 in which the head of the first service robot further comprising:
a head form comprising an opaque layer skin, the skin made of flexible heat resistant silicon or another composite make, wherein, the illuminated skin structure is transparent, a flexible micro LED grid is affixed to the inner contours of the head, respectively the flexible micro LED grid is fabricated with an opaque silicon component;
an array of system components including: a logic controller, generation logic data, an external data storage source, a heads-up display, an image rendering module, an expression output module, a vocal system, a language and character library;
the head further comprising instrumentation including; LIDAR, sensors, cameras, a microphone and speakers;
the head comprising user interaction utilizing a LED display monitor, the LED display monitor configured to display information, graphics, video, and to incorporate audio speakers and microphones for user interaction;
wherein a video display screen further configured with a touch screen to allow user to create input data;
the LED system for displaying special effects inside the head, the special effects projected include facial expressions and other virtual motions;
the LED system further comprising a micro LED grid comprising pre-wiring LED connections including USB to connect to a computer control system;
the LED system configured for displaying special effects inside the head on the LED display monitor and thereby the user can view the images on the outside of the head;
the LED display monitor configured a for displaying images with life like interactive facial expressions via a computer-generated process;
the LED grid comprising wiring connections and USB cable for connecting the micro LED grid to the LED display monitor;
the micro LED grid comprising colors including; red, yellow, blue, green, and the LED system providing a controlling means for controlling the LED lighting colors for displaying graphic patterns of multiple colors;
the micro LED grid comprising flexible construction which is to set inside the contours of the head form; the head may further comprise a protruding mouth, nose, and ear formations;
an internal computerized LED display monitor contained within the head is to include pre-programmed special effects software;
the library configured with different animated eyes, eye brows, noses, lips, ears, and features including virtual hair and jewelry and other character types;
the LED display monitor configured with a means to display information from the heads-up display;
a means for the generation logic data to be visually displayed on the LED display monitor;
an array of sensoring system devices disposed on a section the head, the sensoring system sensors associated with sensors of the first service robot.

12. The self-balancing robot system of claim 1 in which the first service robot, the second service robot vehicle further comprising one or more LED illuminators to illuminate the surrounding environment, the illuminators produce colored illumination such as red, green, and blue, white illumination, and infrared illumination this process is achieved by means of a LED system which is synchronized to the user music by means of Bluetooth speakers.

13. The self-balancing robot system of claim 1 in which the user interface system further comprising:
an artificially intelligent assistant system, the artificially intelligent assistant system providing computing platform associated with one of interactive user interface computing information via an intelligent assistant personality utilized as a means to assist user by visual and verbal communication;
the artificially intelligent assistant system providing a personalized LED face and voice;
the artificially intelligent assistant system providing an array of user communication input and output devices;
the artificially intelligent assistant system providing a Bluetooth smartphone connection to receive and transmit data information associated with the operations of the first service robot, the second service robot vehicle to the store information including associated with the operation of a communication port connecting to the PC monitor;
the artificially intelligent assistant system providing a means to assist user with tasks and assist user to actively control the actions of the first service robot, the second service robot vehicle.

14. The self-balancing robot system of claim 1 in which the user interface system of claim 1 comprising a creating means for the user to create various LED graphics, the graphics to be video displayed on the humanoid robot's head; for generating information data on line, on line logic data including; widgets and on-screen menus.

15. The self-balancing robot system of claim 1 further comprising an intelligent positioning system configured to identify one or more user's motion relative to the environment of the first service robot, and of the second service robot vehicle, and to interact within a dynamically changing environment in real time with user.

* * * * *